United States Patent
Rolle et al.

(10) Patent No.: US 10,824,961 B2
(45) Date of Patent: Nov. 3, 2020

(54) COMPUTER SYSTEM AND METHOD FOR DETERMINING RELIABLE VEHICLE CONTROL INSTRUCTIONS

(71) Applicant: Urban Software Institute GmbH, Chemnitz (DE)

(72) Inventors: Oliver Rolle, Hochheim am Main (DE); Juergen Mueck, Munich (DE)

(73) Assignee: Urban Software Institute GmbH, Chemnitz (DE)

( * ) Notice: Subject to any disclaimer, the term of this patent is extended or adjusted under 35 U.S.C. 154(b) by 284 days.

(21) Appl. No.: 15/845,787

(22) Filed: Dec. 18, 2017

(65) Prior Publication Data

US 2018/0181884 A1    Jun. 28, 2018

(30) Foreign Application Priority Data

Dec. 22, 2016    (EP) .................................... 16206463

(51) Int. Cl.
*G08G 1/0967*    (2006.01)
*G08G 1/01*    (2006.01)
(Continued)

(52) U.S. Cl.
CPC ........... *G06N 20/00* (2019.01); *G05D 1/0088* (2013.01); *G06N 5/04* (2013.01); *G06N 7/08* (2013.01);
(Continued)

(58) Field of Classification Search
CPC ............ G06N 20/00; G06N 7/08; G06N 5/04; G08G 1/096725; G08G 1/091;
(Continued)

(56) References Cited

U.S. PATENT DOCUMENTS

| 2008/0312833 A1 | 12/2008 | Greene et al. |
| 2014/0032089 A1* | 1/2014 | Aoude ................... G08G 1/166 701/117 |

(Continued)

FOREIGN PATENT DOCUMENTS

| WO | 2013003860 A1 | 1/2013 |
| WO | 2016150395 A1 | 9/2016 |

OTHER PUBLICATIONS

European Office Action for International Application No. 16206463.8, dated Jul. 24, 2017, 7 pages.
(Continued)

*Primary Examiner* — Peter D Nolan
*Assistant Examiner* — Ashley L Redhead, Jr.
(74) *Attorney, Agent, or Firm* — Brake Hughes Bellermann LLP

(57) ABSTRACT

Signal Phase and Timing (SPaT) messages are provided to control operation of a vehicle. A computer system receives switching state data (SD1) from one or more traffic lights and provides a SPaT message to the vehicle. The SD1 of a traffic light includes a pass-state (SD1$p$) and a stop-state (SD1$s$) data at respective sampling time points. A signal analyzer in the computer system analyzes the SD1 by: identifying the current signal state (SD1$s$, SD1$p$) of the one or more traffic lights; deriving, from a statistical model, probabilities for future state transitions for one or more future prediction intervals; and determining a minimum end time for a state transition from a current state to the different state. A message composer composes the SPaT message including the determined minimum end time.

20 Claims, 17 Drawing Sheets

(51) Int. Cl.
*G08G 1/09* (2006.01)
*G06N 20/00* (2019.01)
*G05D 1/00* (2006.01)
*G06N 5/04* (2006.01)
*G06N 7/08* (2006.01)

(52) U.S. Cl.
CPC ......... *G08G 1/0129* (2013.01); *G08G 1/0141* (2013.01); *G08G 1/091* (2013.01); *G08G 1/096716* (2013.01); *G08G 1/096725* (2013.01); *G08G 1/096783* (2013.01)

(58) Field of Classification Search
CPC ............... G08G 1/0129; G08G 1/0141; G08G 1/096716; G08G 1/096783; G05D 1/0088
See application file for complete search history.

(56) References Cited

U.S. PATENT DOCUMENTS

| 2015/0120175 | A1* | 4/2015 | Vahidi | G08G 1/0141 |
| | | | | 701/119 |
| 2016/0293006 | A1* | 10/2016 | Bauer | G08G 1/0962 |
| 2018/0018877 | A1* | 1/2018 | Townsend | G08G 1/075 |

OTHER PUBLICATIONS

European Search Report for International Application No. 16206463.8, dated Jul. 7, 2017, 4 pages.
Li et al.: "The Hidden Markov Model of Teleoperation System's Transmission Net", Journal o Computational Information Systems, 9:14, 2013, pp. 5635-5642.
Teixeira et al.: "Tasking Networked CCTV Cameras and Mobile Phones to Identify and Localize Multiple People", UbiComp '10, Sep. 26-Sep. 29, 2010, Copenhagen, Denmark, 2010, 10 pages.
Wikipedia, "Hidden Markov model", Dec. 17, 2019, retrieved on Feb. 24, 2020 from https://en.wikipedia.org/wiki/Hidden_Markov_model, 22 pages.

* cited by examiner

700

| Cycle sec. t | 0 | 1 | 2 | 3 | 4 | 5 | 6 | 7 | 8 | 9 |
|---|---|---|---|---|---|---|---|---|---|---|
| Record 1 at absolute time 0:00* | 0:00 | 0:01 | 0:02 | 0:03 | 0:04 | 0:05 | 0:06 | 0:07 | 0:08 | 0:09 |
| Record 2 at absolute time 0:10* | 0:10 | 0:11 | 0:12 | 0:13 | 0:14 | 0:15 | 0:16 | 0:17 | 0:18 | 0:19 |
| Record 3 at absolute time 0:20* | 0:20 | 0:21 | 0:22 | 0:23 | 0:24 | 0:25 | 0:26 | 0:27 | 0:28 | 0:29 |
| r_t | 3 | 3 | 3 | 3 | 2 | 1 | 0 | 0 | 2 | 3 |
| g_t | 0 | 0 | 0 | 0 | 1 | 2 | 3 | 3 | 1 | 0 |
| p_t | 0 | 0 | 0 | 0 | 0.33 | 0.67 | 1 | 1 | 0.33 | 0 |

| Absolute time | 0:30 | 0:31 | 0:32 | 0:33 | 0:34 | 0:35 | 0:36 | 0:37 | 0:38 | 0:39 |
|---|---|---|---|---|---|---|---|---|---|---|
| Cycle sec. t | 0 | 1 | 2 | 3 | 4 | 5 | 6 | 7 | 8 | 9 |
| p_t | 0 | 0 | 0 | 0 | 0.33 | 0.67 | 1 | 1 | 0.33 | 0 |
| MinET rg | | | | x | | | | | | |
| MaxET rg | | | | | | | x | | | |
| MinET gr | | | | | | | | x | | |
| MaxET gr | | | | | | | | | | x |

FIG. 7B

COMPUTER SYSTEM AND METHOD FOR DETERMINING RELIABLE VEHICLE CONTROL INSTRUCTIONS

CROSS-REFERENCE TO RELATED APPLICATIONS

This application claims priority, under 35 U.S.C. § 119(a), to European Patent Application No. EP16206463.8 filed on 22 Dec. 2016, which application is hereby, incorporated by reference herein in its entirety.

TECHNICAL FIELD

This disclosure generally relates to systems for vehicle control, and more particularly, relates to methods, computer program products and systems for traffic light signal switch prediction for vehicle control.

BACKGROUND

Signal Phase and Timing (SPaT) information can be communicated to vehicles to enable an improved driving behavior of the vehicle in that unnecessary acceleration or braking activities are avoided to reduce energy consumption of the vehicle and to improve overall traffic safety. Besides the actual signal state, SPaT messages include the earliest point in time (minEndTime) when a signal switch to the next signal state can be expected, the most likely point in time (likelyTime) for this signal switch together with a confidence value (confidence), and the latest point in time (maxEndTime) for the signal's next switching state data. Vehicle control systems (e.g., engine or brake control) use the likelyTime for triggering vehicle control instructions in accordance with the expected future signal changes, while, in traditional systems, minEndTime and maxEndTime are typically set to default values without meaning. Typically, minEndTime is set to "now" (current time), while maxEndTime is set to "now+3600 s".

Traditional efforts aim to minimize prediction errors for likelyTime in order to meet strict requirements regarding prediction errors. Since modern traffic lights are often highly flexible and unpredictable in their switching state data behavior the predicted likelyTime is in many cases not reliable enough to be used in a vehicle's assistance systems. The more adaptive to traffic the traffic light systems are, the more difficult they are to predict. This becomes an obstacle for the deployment of traffic light related assistance systems in vehicles which depend very much on the reliability of the SPaT information with regards to the predicted next signal switch.

Consideration is now being given to improving the reliability of SPaT information with regards to the predicted next signal switch of a traffic light (i.e. traffic signal) and use of the information for vehicle control, thereby, improving traffic safety.

SUMMARY

In a general aspect, a computer system described herein provides SPaT messages to a vehicle, wherein the SPaT messages include reliable timing parameters to influence or control the operation of the vehicle by driving assistance systems, drive controllers, or board computers etc., of the vehicles.

Reliable timing parameters, as used herein, refer to predicted signal switching state data time points which can be predicted with a probability close to 1. In traditional systems, a likelyTime parameter is typically provided for a potential switching state data time point with a coarse confidence value. (See e.g., SPaT related specification SAE J2735, Revision 10-2014 Oct. 20, at web site: http[://]forge.etsi.org/websvn/
listing.php?repname=ITS.ITS_ASN1&path=%2
Ftrunk%2FMAP_SPAT_SAEJ2735%2F20141020%
2F&rev=10&peg=10#ab36907d03ab1d162a
4353b2dc02481cc). The confidence value TimeIntervalConfidence may be thereby coded according to the following mapping (as defined in the file DSRC_REG_D.asn at website:
http[://]forge.etsi.org/websvn/
filedetails.php?repname=ITS.ITS_ASN1&path=%
2Ftrunk%2FMAP_SPAT_SAEJ2735%2
F20141020%2FDSRC_REG_D.asn&peg=10):

| DE_TimeIntervalConfidence (Desc Name) Record 144 TimeIntervalConfidence ::= INTEGER (0 . . . 15) | |
|---|---|
| Value | Probability |
| 0 | 21% |
| 1 | 36% |
| 2 | 47% |
| 3 | 56% |
| 4 | 62% |
| 5 | 68% |
| 6 | 73% |
| 7 | 77% |
| 8 | 81% |
| 9 | 85% |
| 10 | 88% |
| 11 | 91% |
| 12 | 94% |
| 13 | 96% |
| 14 | 98% |
| 15 | 100%. |

What is sent via the SPaT message to the vehicle is one of the integer values 0 to 15 indicating the respective range confidence values associated with the integer via the mapping. However, when for example the vehicle receives a likelyTime parameter indicating a potential switch in 7 seconds with a confidence between 68% and 73% the information is not really helpful in that the vehicle cannot derive any specific operating instruction from the information. Therefore, it may be advantageous to provide reliable timing parameters to the vehicle which indicate a state change (signal switch) with a probability of close to 1. Not in every situation such reliable timing parameters can be provided. But when they can be provided, the vehicle can use the information to adjust its operation in accordance with the predicted switching state data time points.

In an aspect, the computer system, described herein, has an interface component to receive switching state data, and, optionally, detector data (e.g., from induction coil detectors, camera detectors, etc.), parameters (e.g., minimum length of a green phase) and operating states (e.g., state information indicating whether a detector works properly or has a defect) and other operating parameters from one or more traffic lights. the switching state data can be used as the relevant parameter for signal prediction. Further, optional data can be used as additional information in the respective prediction models to improve the accuracy of predictions. The switching state data of a particular traffic light includes signal states including at least a pass-state and a stop-state of the particular traffic light at respective sampling time points. In most cases, a green light signal represents the pass-state and a red light signal represents the stop-state. Some traffic lights can switch into further states. For example, some traffic lights include yellow light signals which represent an intermediate state between the pass and stop-states. The intermediate states often have the function to alert the driver of a car that a signal change is coming (e.g., either from stop to pass or from pass to stop). The disclosed computer system can work with any number of intermediate states as long as a sequence of intermediate states is followed by either a pass- or a stop-state at some point in time. The switching state data can be transmitted via a network which communicatively couples the computer system with the traffic light control system. The switching state data may also be captured via visual sensors (e.g., cameras), which can extract the respective states from captured images using image processing methods.

In an aspect, the computer system, described herein, includes a signal analyzer component to perform a sequence of analysis steps for prediction intervals having the same length as the sampling intervals. The term "prediction interval" as used herein describes a time interval of the same length as the length of a sampling interval. The prediction interval is in the future with regards to the current sampling interval during which the state data was received. Typically, the sampling intervals and the prediction intervals have a duration of one second. However, others intervals may be chosen instead. The length of the intervals should be adjusted to the length of a switching state data cycle of the traffic light(s) so that a meaningful prediction becomes possible. If the switching state data cycle (cycle length) is 20 seconds, an interval length of 10 seconds would certainly make no sense when trying to precise predict the next switching state data time point. A meaningful length for the sampling/prediction intervals can be defined based on the respective situation.

Based on the received switching state data, the signal analyzer can identify the current signal state of the one or more traffic lights. In the case of a single traffic light, there is only one signal state to be determined for this particular traffic light. In other words, the signal analyzer retrieves from the received data whether the traffic light is currently in a pass- or stop-state (or perhaps in an intermediate state). However, the system can also handle switching states (state data) of a plurality of traffic lights. In this case, the aggregate signal state may include a plurality of sub-states, where each sub-state characterizes the current state of one of the traffic lights.

In an aspect, the computer system, described herein, stores a statistical model which is trained on the basis of historic state transitions of the one or more traffic lights. The statistical model reflects the switching state data behavior of the one or more traffic lights in the past. The terms, "historic switching state data", "historic state transitions", or "switching state data behavior in the past" as used herein may be understood to mean that the switching state data relates to the time point of the currently processed signal state. For example, the switching state data include switching state data events (state transitions) which occurred in the previous cycle interval (e.g., the previous cycle second). A probability module in the computer system can derive probabilities from the statistical model for future state transitions from the current state into a different state for one or more future prediction intervals. The probabilities may be encoded in the statistical model or may be computed based on information contained in the statistical model. The probability module can be part of the signal analyzer or it can be part of the module storing the statistical model.

The signal analyzer can further determine a minimum end time point (referred to as minimum end time) for a state transition from the current state to the different state as the start of the nearest future prediction interval where the probability of the current state falls below a predefined first threshold value. For example, the first threshold value may be between 1 and 0.97 which indicates that the traffic light(s) can switch their state(s) at the earliest moment in time during the prediction interval which follows the last prediction interval associated with a probability for the current state which is above the first threshold value. For example, if the current state is the pass-state the minimum end time point may indicate that the pass state will remain for at least another 6 seconds. The vehicle may drive at low speed and may compute 7 seconds to reach the traffic light at its current speed. In this situation, the vehicle may accelerate to speed up and pass the traffic light within the predicted 6 seconds because it knows that, in any case, the pass-state phase will last at least until the minimum end time.

The system further has a message composer component to compose the SPaT message in accordance with the above mentioned SAE J2735 standard including the determined minimum end time.

Finally, the system provides the composed SPaT message to the vehicle via its interface component. The vehicle is now in possession of a reliable timing parameter and can take operating decisions accordingly. As described in the example above, it may trigger an acceleration operation to pass the traffic light during the pass-state phase with certainty. The acceleration decision may of course depend on other constraints such as the maximum speed limit or the traffic density.

In an aspect, the signal analyzer can further determine a maximum end time point (referred to as maximum end time) for a particular state transition from the current state to the different state as start of the nearest future prediction interval where the probability of the different state exceeds a predefined second threshold value. In other words, the maximum end time predicts the latest point in time where the traffic light state switches to the different state. For example, the second threshold may be defined between 1 and 0.97. That is, the traffic light will switch from its current state (e.g., pass-state) into the different state (e.g., stop-state) with a probability above 97% during the prediction interval following the interval where the probability p of the current state was still above $p=1$−second threshold value. The determined maximum end time therefore provides information about when the current state will at the latest end with a high reliability. For example, when a car is approaching a green traffic light and has 6 seconds left to pass the traffic light, and when the car receives a SPaT message with a maximum end time of 4 seconds, the car can initiate a breaking action because it is not possible to pass the traffic light during the pass-state phase. On the other hand, if a likelyTime of 6 seconds would be provided in this situation with a confidence between 68% and 73%, the information would not help to trigger a meaningful response of the vehicle. In this example, the vehicle can trigger a breaking action if the traffic light cannot be passed during the pass-state phase anymore, or it may trigger an acceleration action if the received maximum end time is sufficient to pass during the pass-state phase, but only if the current speed is increased. Whereas a likleyTime can always be provided, a maximum end time can only be provided in fewer situations where there is an almost 100% probability for a state transition. However, this reliable information which is provided less frequently can then be used by the vehicle to make a dedicated decision in all cases, whereas the likelyTime can rarely be used for a dedicated decision impacting the operation of the vehicle.

If the maximum end time is determined, the system may use a likelyTime module to estimate, in addition to the maximum end time, a likely time and a corresponding confidence value for the particular state transition. Details for estimating the likelyTime are disclosed in the detailed description. For example, machine learning approaches can be used for this purpose. In this implementation, where the maximum end time is determined, the message composer is further configured to compose the SPaT message including the determined maximum end time, the estimated likely time and the corresponding confidence value. In other words, the maximum end time, likelyTime and confidence values are only computed and transmitted in such situations where a state switch is expected with certainty. For example, when a car is approaching a green traffic light that can be interrupted by a pedestrian demand, likelyTime and confidence are only transmitted to the car when the pedestrian signal will become green with certainty. If the car would receive a likelyTime and confidence information without a pedestrian demand the car's assistance systems may for example activate a breaking maneuver without need, irritating the driver and reducing trust into the system's functionality. If, on the other hand, no minimum end time is sent in this situation, the assistance system cannot make usage of this valuable information in order to accelerate even in case if this would guarantee a passage is guaranteed during the green phase.

In an aspect, the computer system, described herein, further includes a training module to generate and train the statistical model based on switching state data received from the one or more traffic lights. In one implementation, the statistical model can be a Hidden Markov Model (HMM) representing potential state transitions of the one or more traffic lights with respective probabilities within a switching state data cycle. The training module 120 can generate the HMM by the following steps: detecting the light signal state in each sampling time point and checking if the detected state already exists as a hidden state in the HMM. If the corresponding hidden state transition already exists, selecting a hidden state by the destination of the hidden state transition. If the hidden state transition is not existing but the received signal state can be explained by an already existing hidden state then selecting the explaining hidden state. If the hidden state transition is not existing and a corresponding hidden state is not in the HMM, creating and selecting a new hidden state. Then, updating the before-hidden-state with the latest-hidden-state and the latest-hidden-state with the selected hidden state, creating a transition between before-hidden-state and latest-hidden-state if the transition did not already exist, and incrementing a transition counter of the transition between the before-hidden-state and the latest-hidden-state.

In the case of a HMM statistical model, the probability for a state transition can be determined based on an evaluation of all hidden state transition counter values between two subsequent cycle time points in the HMM. It can be advantageous that the hidden state transition counters can be incremented with each data sample being received by the computer system. That is, the HMM can be trained while at the same time being used for the prediction of the timing parameters. This allows real-time probability computation updates for the state transitions between hidden states with high accuracy. Each time, a hidden state counter is incremented the associated probability changes for the affected hidden state transitions can be re-computed on the fly and are immediately available for the prediction computed during the next sampling interval In an example implementation, the statistical model alternatively includes averaged probabilities of one or more signal states for each sampling interval within a switching state data cycle. In this implementation, the training module 120 may be configured to generate the statistical model by performing the following steps: recording a statistically relevant sized sample of switching state data cycles; identifying, for each cycle in the sample of switching state data cycles, a cycle start time; and deriving probabilities for at least one signal state for the sampled switching state data having the same time offsets from the respective cycle start times.

In an aspect, the computer system, described herein, can load a computer program with instructions into a memory of the computer system and execute the computer program with at least one processor of the system so that the above disclosed functions are performed by the computer system to determine state changes of a technical system. When the computer system executes the computer program, the executed computer-implemented method for providing SPaT messages to a vehicle (wherein the SPaT messages include reliable timing parameters to influence the operation of the vehicle) can be summarized with the following steps: receiving switching state data from one or more traffic lights wherein switching state data of a particular traffic light includes as signal states at least a pass-state and a stop-state of the particular traffic light at respective sampling time points; identifying the current signal state of the one or more traffic lights; deriving, from a statistical model trained on the basis of historic state transitions of the one or more traffic lights, probabilities for future state transitions from the current state into a different state for one or more future prediction intervals, the prediction intervals having the same length as the sampling intervals; determining a minimum end time for a state transition from the current state to the different state as the nearest future prediction interval where the probability of the current state falls below a predefined first threshold value; composing a SPaT message including the determined minimum end time; and providing the composed SPaT message to the vehicle.

In one implementation, the method further includes: determining a maximum end time for a particular state transition from the current state to the different state as the nearest future prediction interval where the probability of the different state exceeds a predefined second threshold value; and if the maximum end time is determined, estimating a likely time and a corresponding confidence value for the particular state transition, and composing the SPaT message further including the determined maximum end time, the estimated likely time and the corresponding confidence value.

In one example implementation, where the statistical model is a Hidden Markov Model (HMM) representing potential state transitions of the one or more traffic lights with respective probabilities within a switching state data cycle, the method can build or generate the method prior to using the model for the above prediction purpose. The generation includes: detecting the light signal state in each sampling time point; checking if the detected state already exists as a hidden state in the HMM; if the corresponding hidden state transition already exists, selecting a hidden state by the destination of the hidden state transition; If the hidden state transition is not existing but the received signal state can be explained by an already existing particular hidden state then selecting the explaining particular hidden state; if the hidden state transition is not existing and a corresponding hidden state is not in the HMM, creating a new hidden state and selecting the new hidden state; updating the before-hidden-state with the latest-hidden-state and the latest-hidden-state with the selected hidden state, creating a transition between before-hidden-state and latest-hidden-state if the transition did not already exist, and incrementing a transition counter of the transition between the before-hidden-state and the latest-hidden-state. Thereby, the probability for a state transition can be determined based on an evaluation of all hidden state transition counter values between two subsequent cycle time points of the HMM.

In one example implementation, the statistical model includes averaged probabilities of one or more signal states for each sampling interval within a switching state data cycle. In this implementation, the method includes steps to generate the statistical model by: recording a statistically relevant sized sample of switching state data cycles; identifying, for each cycle in the sample of switching state data cycles, a cycle start time; and deriving probabilities for at least one signal state for the sampled switching state data having the same time offsets from the respective cycle start times.

Further aspects of the disclosure herein will be realized and attained by means of the elements and combinations particularly depicted in the appended claims. It will be understood that both, the foregoing summary and the following detailed description are exemplary and explanatory only and are not restrictive of the particular implementations or embodiments described herein.

BRIEF DESCRIPTION OF THE DRAWINGS

FIG. 7A illustrates an example of a further statistical model generated on the basis of historic state data records.

FIG. 7B illustrates an example determination of minimum end times and maximum end times based on the further statistical model.

DETAILED DESCRIPTION

Figure 1:
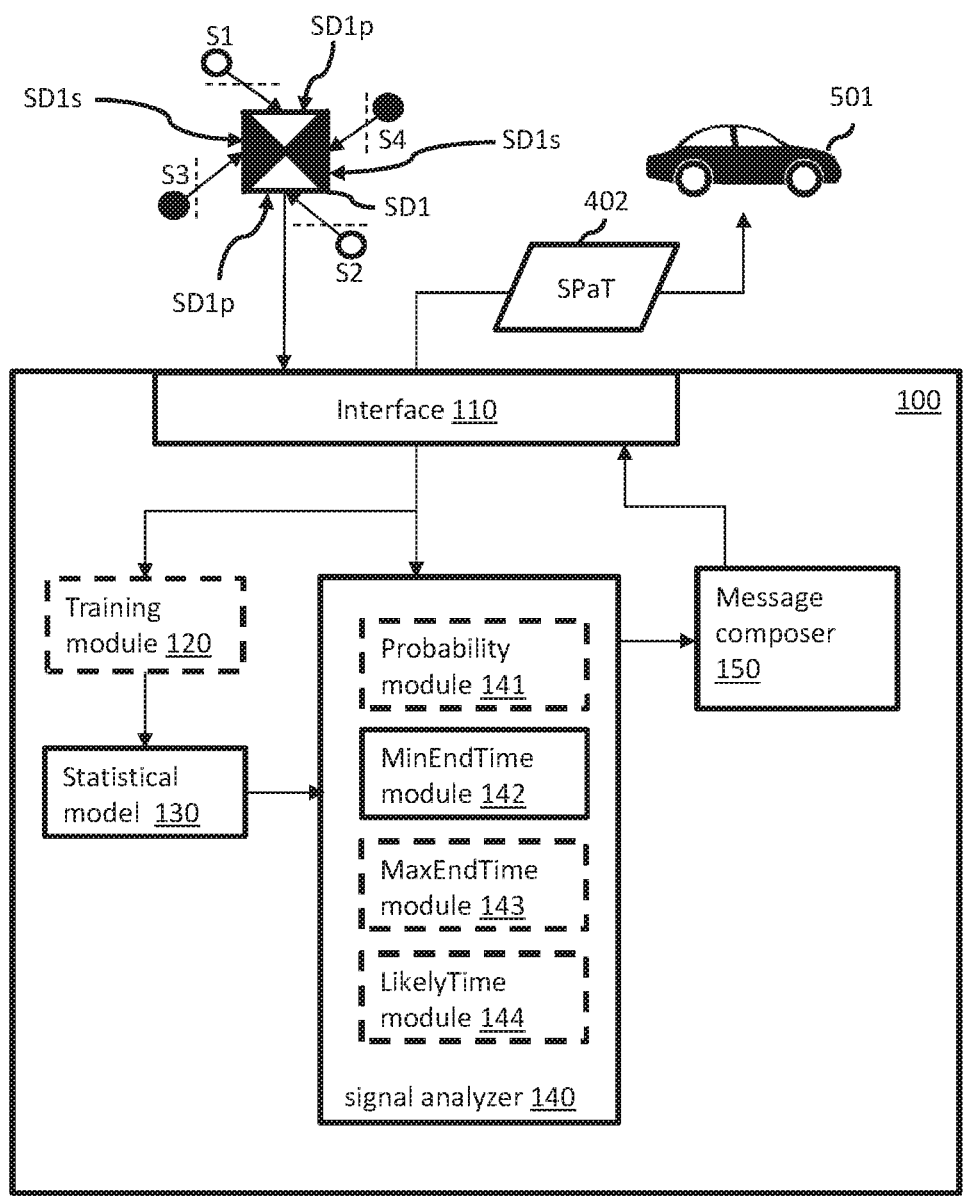
FIG. 1 is a schematic diagram of an example computer system for providing SPaT messages to a vehicle wherein the SPaT messages include reliable timing parameters to influence the operation of the vehicle.

FIG. 1 is a schematic diagram of an example computer system 100 for providing SPaT messages 402 to a vehicle 501 via interface 100 wherein the SPaT messages include reliable timing parameters to influence or control the operation of the vehicle. FIG. 1 is described herein in the context of FIG. 2, which is a flowchart of a computer-implemented method 1000 that can be performed, for example, by computer system 100. Computer system 100 may be coupled to control devices (e.g., driving assistance systems, drive controllers, or board computers, etc.) of vehicle 501. The control devices of vehicle 501 may control operation of vehicle 500 according to the SPaT messages.

In an example scenario shown in FIG. 1 (and FIGS. 3A-3C), computer system 100 is communicatively coupled with one or more traffic lights (traffic signals) S1 to S4. Each traffic light has a dedicated signal state at each given point in time. The traffic light can switch at least between a pass-state SD1$p$ and a stop-state SD1$s$. Intermediate states may exist. The driving directions in the example are in the horizontal and the vertical directions. Any sequence of intermediate states is followed at some point in time by either the stop-state or the pass-state. In the example, the current state of S1 and S2 is the pass-state SD1$p$ and the current state of S3 and S4 is SD1$s$. The square SD1 represents the combined state of all four traffic lights with four sub-states corresponding to the states of the respective traffic lights. The sub-states are illustrated via the triangles SD1$p$ (pass-state) and SD1$s$ (stop-state) making up the combined state SD1. In general, the combined (or aggregated state) of all signals n of the one or more traffic lights results in $2^n$ possible states, but typically in reality only a few states (typically less than 50) are really used. In the example the number of possible states for the four traffic lights S1 to S4 is $2^4=16$. However, in the following example only three combined states are actually used for the prediction of future states. The used states are referred to as: the first combined state where the traffic lights S1, S2 are in pass state and the S3, S4 are in stop state (vertical pass); the second combined state where the traffic lights S1, S2 are in stop state and the S3, S4 are in stop state (all stop); and the third combined state where the traffic lights S1, S2 are in stop state and the S3, S4 are in pass state (horizontal pass).

The combined state can be sampled at predefined sampling intervals. Typically, a sampling interval has a length (duration) of one second although it can be chosen longer or shorter dependent on the switching state data cycle of the traffic lights. The combined state SD1 can be received (FIG. 2, 1100) at the sampling frequency by the computer system 100 via interface 110. Any appropriate communication technology, such as for example, wireless networks, local area networks or wide area networks may be used establish the communicative coupling between the computer system 100 and the traffic lights. Typically, the connection is not directly between the computer system 100 and the traffic lights but can be established between the computer system 100 and a control system of the traffic lights where the control system can provide the combined state SD1 for the respective traffic lights S1 to S4. It is to be noted that the number of four traffic lights is arbitrary and only for purposes of illustration. Any number of traffic lights can be used and their respective states can be included in a combined state as sub-states.

Figure 2:
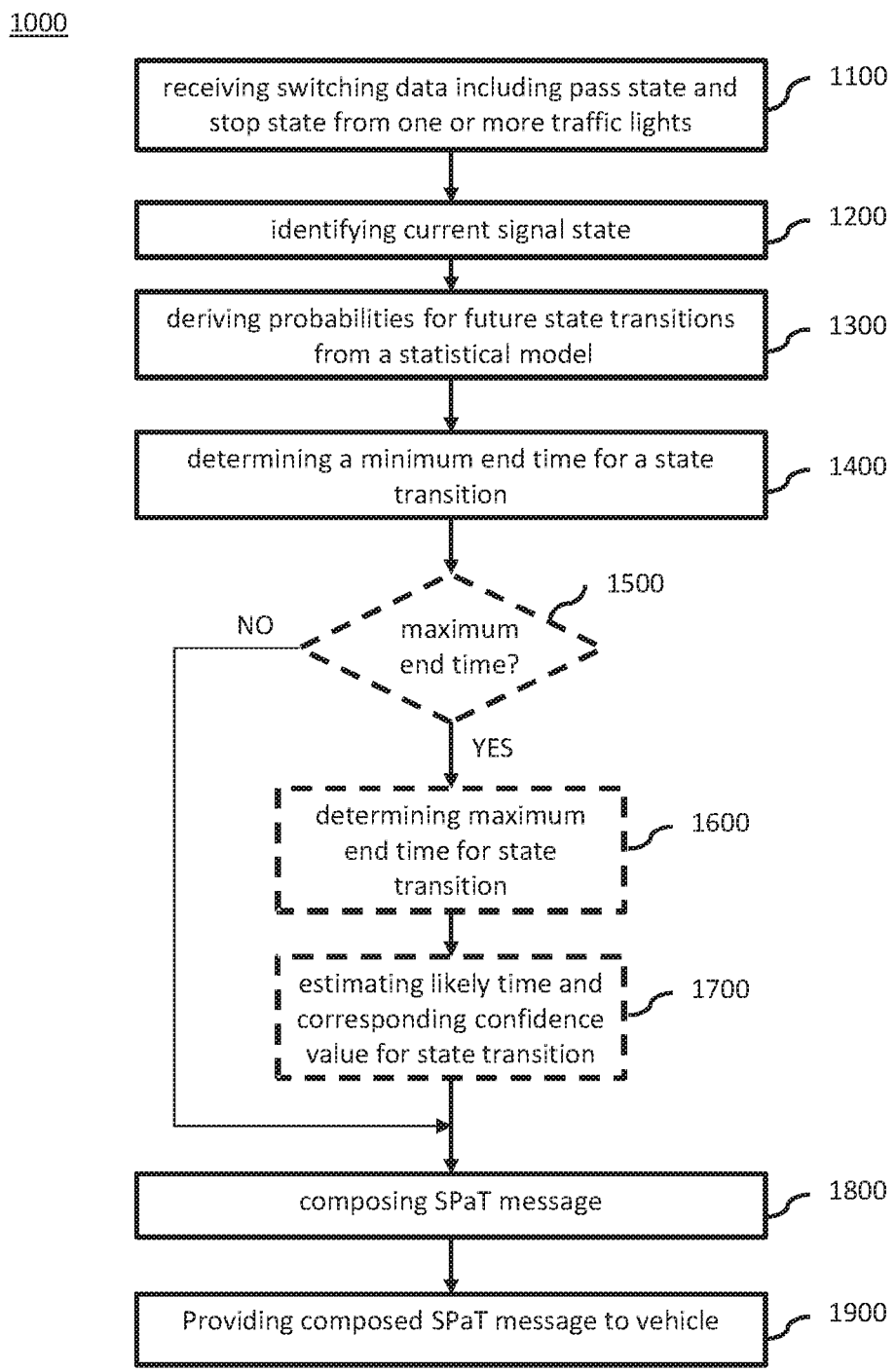
FIG. 2 is a flowchart of an example computer-implemented method, which can be performed by the computer system of FIG. 1.

In other words, at sampling time points in accordance with the sampling frequency, the interface component 110 receives switching state data from the traffic lights S1 to S4 (FIG. 2, 1100). The switching state data corresponds to the combined state SD1 which includes the current sub-states of the respective traffic lights. For simplicity of explanation, in the example, the simplified assumption is made that traffic lights switch only between a pass-state SD1$p$ and a stop-state SD1$s$. The received state data SD1 can be identified (FIG. 2, 1200) as the current signal state of the traffic lights to be analyzed. That is, the computer system 100 can be aware of the signal states of each of traffic lights which are represented by a sub-state in the combined state SD1.

The interface 110 provides the received state data SD1 to a signal analyzer 140 which can predict future state switches of the traffic lights S1 to S4 by using a statistical model 130 provided to the computer system 100. The statistical model can be stored in the computer system 100 or it may be stored at a remote storage location which is accessible by the computer system 100. The signal analyzer 140 can perform a sequence of analysis steps for predefined prediction intervals having the same length as the sampling intervals. In other words, the signal analyzer works at a clock speed which is synchronized with the sampling frequency at which the state data is received.

The signal analyzer can further derive (FIG. 2, 1300), from the statistical model 130, probabilities for future state transitions of the traffic lights from the current (received) state into a different state for one or more future prediction intervals. For this purpose, the statistical model can be trained on the basis of state transitions of the one or more traffic lights which already occurred in the past. The probabilities for the future state transitions may already be intrinsically included in the statistical model or they may be computed by a probability module 141 of the signal analyzer based on the data available in the statistical model 130.

The signal analyzer 140 has a MinEndTime module 142 to determine (FIG. 2, 1400) a minimum end time for a state transition from the current (combined) state to the different (combined) state as the nearest future prediction interval where the probability of the current state falls below a predefined first threshold value. The first threshold value can be defined in a way that any value below the first threshold value indicates that the current state is not maintained with certainty beyond the predicted minimum end time. Practically useful first threshold values may be in the range between 1 and 0.97 taking into account that some noise may not always allow a threshold value of 1 (100%). In other words, a probability for a future state which is above 97% may still be seen as a probability associated with certainty for that state to be in the predicted state during the respective prediction interval.

The determined minimum end time can be provided to a message composer component 150 configured to compose (FIG. 2, 1800) the SPaT message 402 including the determined minimum end time. The composed SPaT message 402 can be provided (FIG. 2, 1900) to the vehicle 501 via interface 110. For this purpose, interface 110 may support a communication protocol which allows exchanging SPaT messages with vehicles according to the above mentioned SPaT specification standard.

Once the SpaT message 402 with the minimum end time is received by the vehicle 501, the received information provides advantages with regard to the operation of the vehicle. For example, based on the received minimum end time, the vehicle may take decisions about automatically breaking or accelerating in the context of the current traffic situation. This can be advantageous in an autonomous driving mode of the vehicle.

In example implementations, computer system 100 may provide further optional features which can perform additional optional steps. Optional features/steps are illustrated by dashed frames in FIGS. 1 and 2.

In one implementation, the signal analyzer 140 may further include a MaxEndTime module 143 to determine (FIG. 2, 1600) a maximum end time for a particular state transition from the current state to the different state as the nearest future prediction interval where the probability of the different state exceeds a predefined second threshold value. In other words, a maximum end time can be identified once the probability for the different state reaches the second threshold value indicating certainty for the different state during the respective prediction interval. The second threshold value can be advantageously in a range between 1 and 0.98 and may be the same as the first threshold value.

If a maximum end time can be determined (FIG. 2, 1500), it can indicate that the traffic lights will switch to a new state (the different state) at the very latest during the prediction interval for which the maximum end time is predicted (FIG. 2, 1600). In such a situation it can be advantageous to provide the likelyTime together with the maximum end time to the vehicle because the likelyTime provides information about the most probable future signal state switch which can help in selecting better driving strategies for the vehicle. For this purpose, the computer system 100 may include a LikelyTime module 144 to estimate (FIG. 2, 1700) a likely time and a corresponding confidence value for the predicted future state transition. In this implementation, the vehicle can not only become aware of the maximum end time at which the new (different) state will be reached with certainty but also becomes aware of the most likely time at which the switch of the state will occur and with which confidence it will occur at the most likely time. This information can be valuable for a driver assistance system that compares different possible behaviors (driving strategies) and needs knowledge about the probabilities in order to weight and evaluate the different behaviors before selecting one for realization (execution). In this implementation, the message composer also includes (FIG. 2, 1800) the determined maximum end time, the estimated likely time and the corresponding confidence value SPaT message 402 which can be then provided (FIG. 2, 1900) to the vehicle.

In one embodiment, the computer system 100 further includes the training module 120 to generate and train the statistical model 130 based on switching state data SD1 received from the one or more traffic lights. Examples of the training module 120 are described in details in the context of FIGS. 5A to 5E and 7A.

Figure 3A:
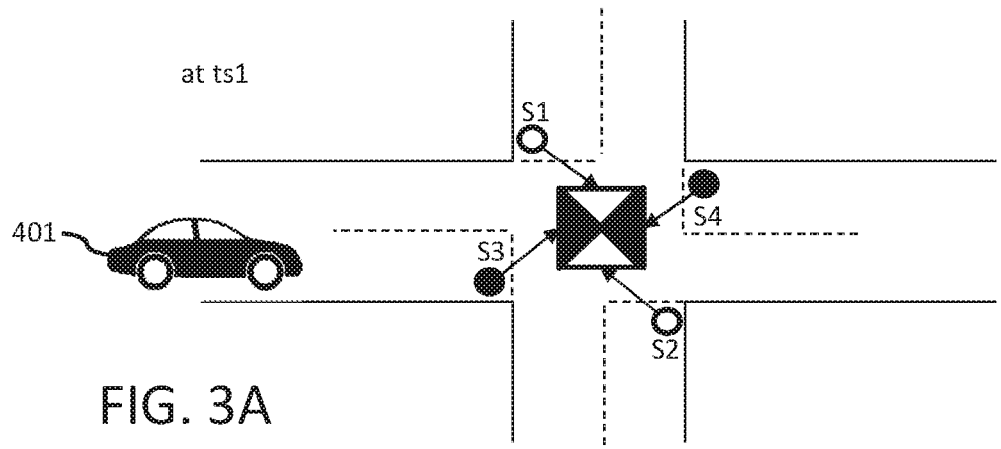
FIGS. 3A to 3C illustrate the state of four example traffic lights at three different sampling time points.
Figure 3B:
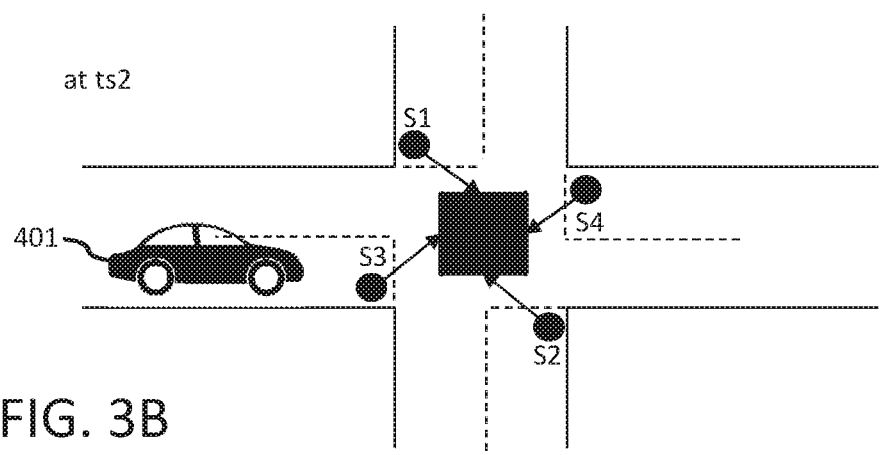
Figure 3C:
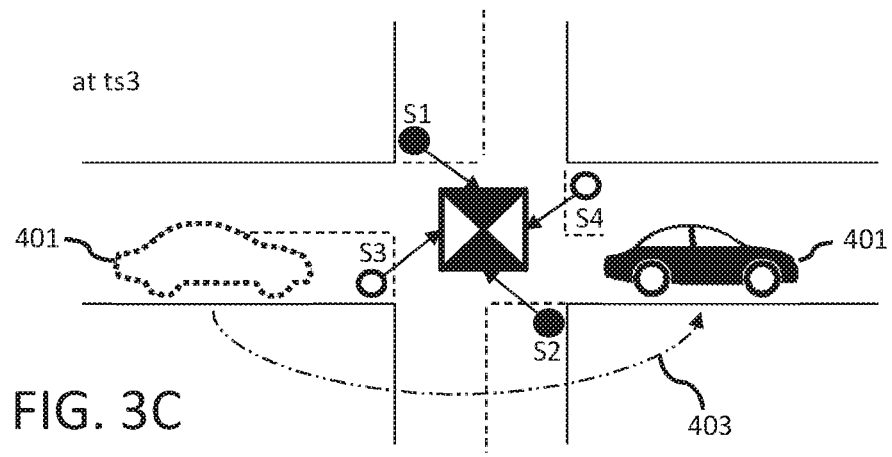

FIGS. 3A to 3C illustrate the state of four example traffic lights S1 to S4 at a crossing at three different sampling time points t1, t2, t3. The combined switching state is again illustrated as the square in the middle including the respective sub-states of the traffic lights (as in FIG. 1). The crossing is defined by the lines illustrating four rectangular roads where each road has two lanes separated by dashed lines. The stop area for a car in front of a traffic light in the stop-state (e.g., red light) is limited by the dashed lines perpendicular to the respective lane directions.

At sampling time point ts1 (cf. FIG. 3A), the traffic lights S1 and S2 are in pass-state and S3, S4 are in stop-state. The vehicle 401 is approaching S3 from the left to the right. A first combined state can be transmitted to the computer system 100 (white triangles in vertical direction indicating the sub-state pass, black triangles in horizontal direction indicating the sub-state stop) at ts1 and preceding or succeeding sampling time points which are sampled as long as the first combined state remains.

At sampling time point ts2 (cf. FIG. 3B), the traffic lights S1, S2 have switched to stop-state. S3, S4 remain unchanged. A second combined state (four black triangles) can be transmitted to the computer system 100 at ts2 and preceding or succeeding sampling time points which occur as long as the second combined state remains.

At sampling time point ts3 (cf. FIG. 3C), the traffic lights S1, S2 remain in stop-state whereas S3, S4 have switched to pass-state. A third combined state (white triangles in horizontal direction indicating the sub-state pass, black triangles in vertical direction indicating the sub-state stop) can be transmitted to the computer system 100 at ts3 and preceding or succeeding sampling time points which occur as long as the third combined state remains. Vehicle 401 has passed 403 the crossing during the horizontal pass-phase (third combined state).

Figure 4A:
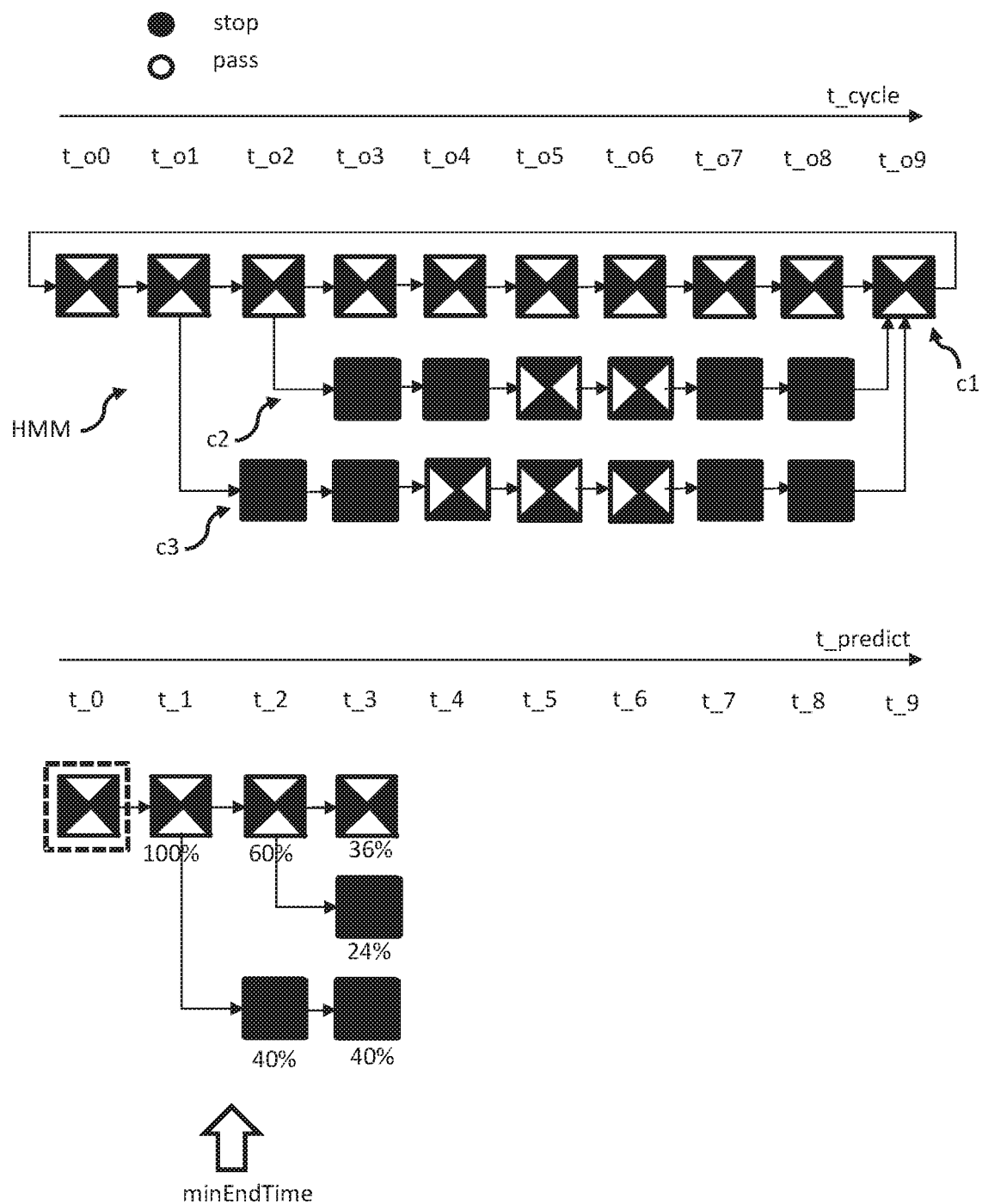
FIGS. 4A to 4D illustrate an example determination of a minimum end time for a SPaT message based on an example Hidden Markov Model at four subsequent sampling intervals.

FIG. 4A illustrates an example of determining a minimum end time minEndTime in an embodiment with a Hidden Markov Model HMM as statistical model. The HMM illustrated in the upper part of figure is defined for a cycle length which corresponds to 10 sampling intervals. The first interval t_o0 has a zero offset in the switching cycle [t_o0, t_o9] and the last interval t_o9 has an offset of nine cycle intervals. For convenience in description below, the term "cycle second" will be used for the intervals. However, it will be understood that the length of the intervals need not be limited to be one second. The intervals may have any other interval length values. The squares in the HMM correspond to the hidden states of the HMM. The arrows indicate hidden state transitions which can occur with respective probabilities (not shown). The hidden states correspond to possible combined states of the traffic lights for which the HMM is supposed to make predictions for future state switching time points. In the example, the HMM spans over ten cycle intervals which have the same length as the sampling/prediction intervals. The example HMM includes a first chain c1 which reflects a situation in which the situation of FIG. 3A (pass-state for vertical direction) prevails over the full switching cycle. When reaching the end of the cycle the last hidden state at t_o9 transitions again into the first hidden state t_o0. The first chain c1 may reflect that without traffic the vertical direction has priority (pass-state).

The second chain c2 has a transition from the first combined state into the second combined state (cf. FIG. 3B) from t_o2 to t_o3. At t_o5 the combined state has transitioned into the third combined state (cf. FIG. 3C, pass-state for horizontal direction) before switching back to the second combined state at t_o7. Finally, at t_o9 the second chain c2 has transitioned back into the last state (first combined state) of the first chain c1. The second chain c2 may reflect a first scenario with low traffic moving in the horizontal direction (e.g., only one vehicle is detected by an induction coil or other sensor). The traffic lights switch for a short time into the third combined to let the detected vehicle pass.

The third chain c3 has a transition from the first combined state into the second combined state (cf. FIG. 3B) from t_o1 to t_o2. At t_o4 the combined state has transitioned into the third combined state (cf. FIG. 3C, pass-state for horizontal direction) before switching back to the second combined state at t_o7. Finally, at t_o9 the third chain c3 has transitioned back into the last state (first combined state) of the first chain c1. The third chain c3 may reflect that, a plurality of vehicles is approaching S3 in the horizontal direction. The traffic lights switch for a longer time into the third combined state to allow the vehicles to conveniently pass S3.

The lower part of FIG. 4A illustrates the determining of a minEndTime for a situation where the current switching state data (dashed frame) corresponds to the first combined state in the first cycle second of the HMM. The lower part of the figure indicates the probabilities for the states of the HMM during the first four cycle seconds. Current state at t_0 (current time) is certain. The HMM can be now used to predict the cycle second corresponding to the minimum end time for the current state. The probability for the current state for the next cycle second t_1 is still 100% (no alternative chains). However, there is a 40% probability for the traffic lights to transition to the first hidden state of the third chain in the future cycle second t_2. This means that the probability to remain in the current state remains only a 60%. The probability to transition from the current state into the first hidden state of the second chain at t_3 is again 40%. As a result, the total probability to reach the first hidden state of the second chain results in 60%*40%=24%. The probability to remain in the first combined state after t_2 is therefore only 36%.

The minimum end time can be then determined as the beginning of the cycle second t_2 because at this time the probability for remaining in the current state falls clearly below the first threshold. 60% probability is of course anything but certain. Therefore, only the future time until the end of cycle second t_1 can be predicted with certainty in that the current state will prevail. This information can be the encoded in minEndTime and sent to the vehicle.

Figure 4B:
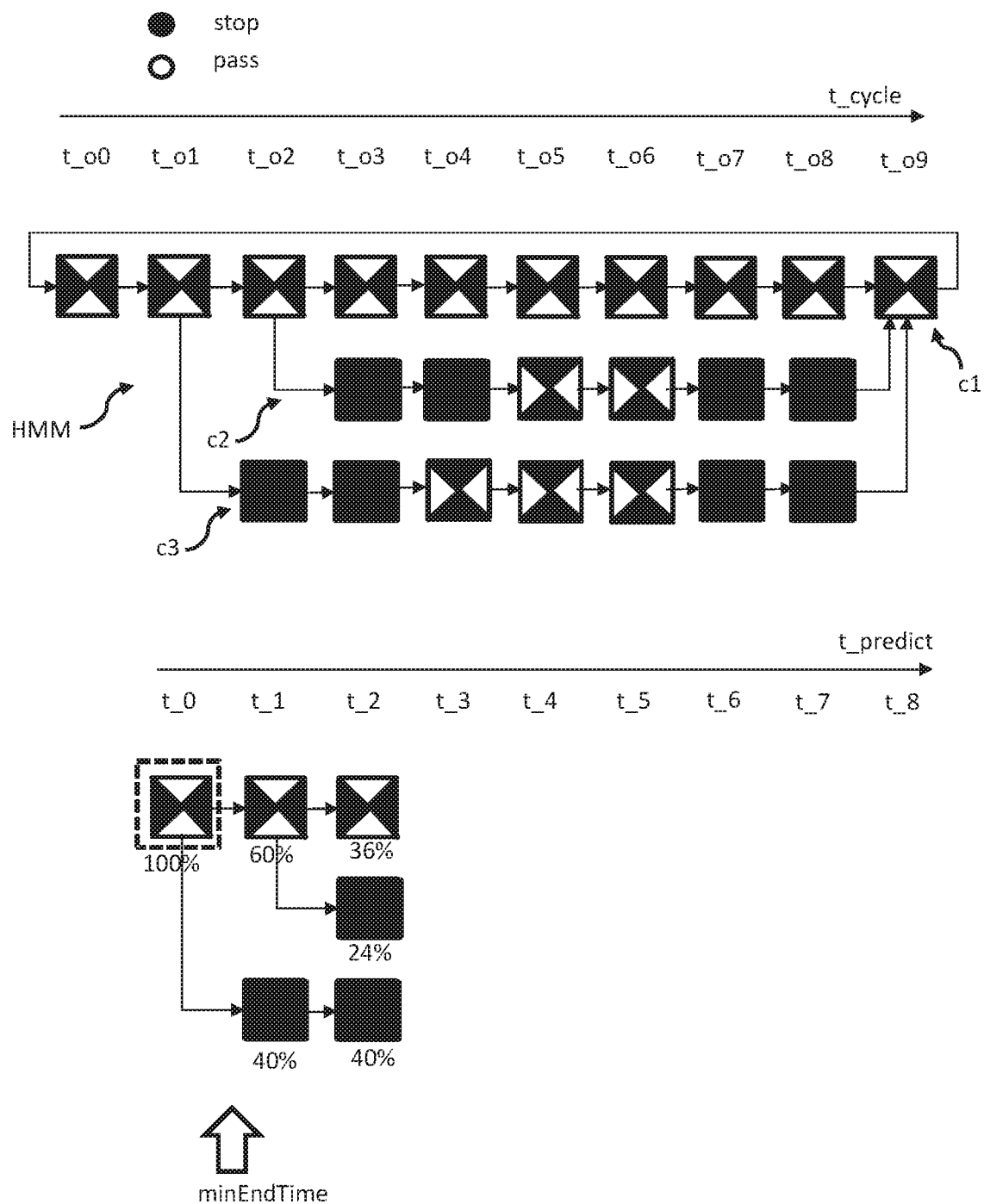

FIG. 4B shows a similar situation as FIG. 4A. The difference is that the current combined state (dashed frame) now corresponds to the second cycle second t_o1 of the HMM. In this situation the minEndTime is already at the end of the current cycle second for the same reasons as explained in FIG. 4A.

Figure 4C:
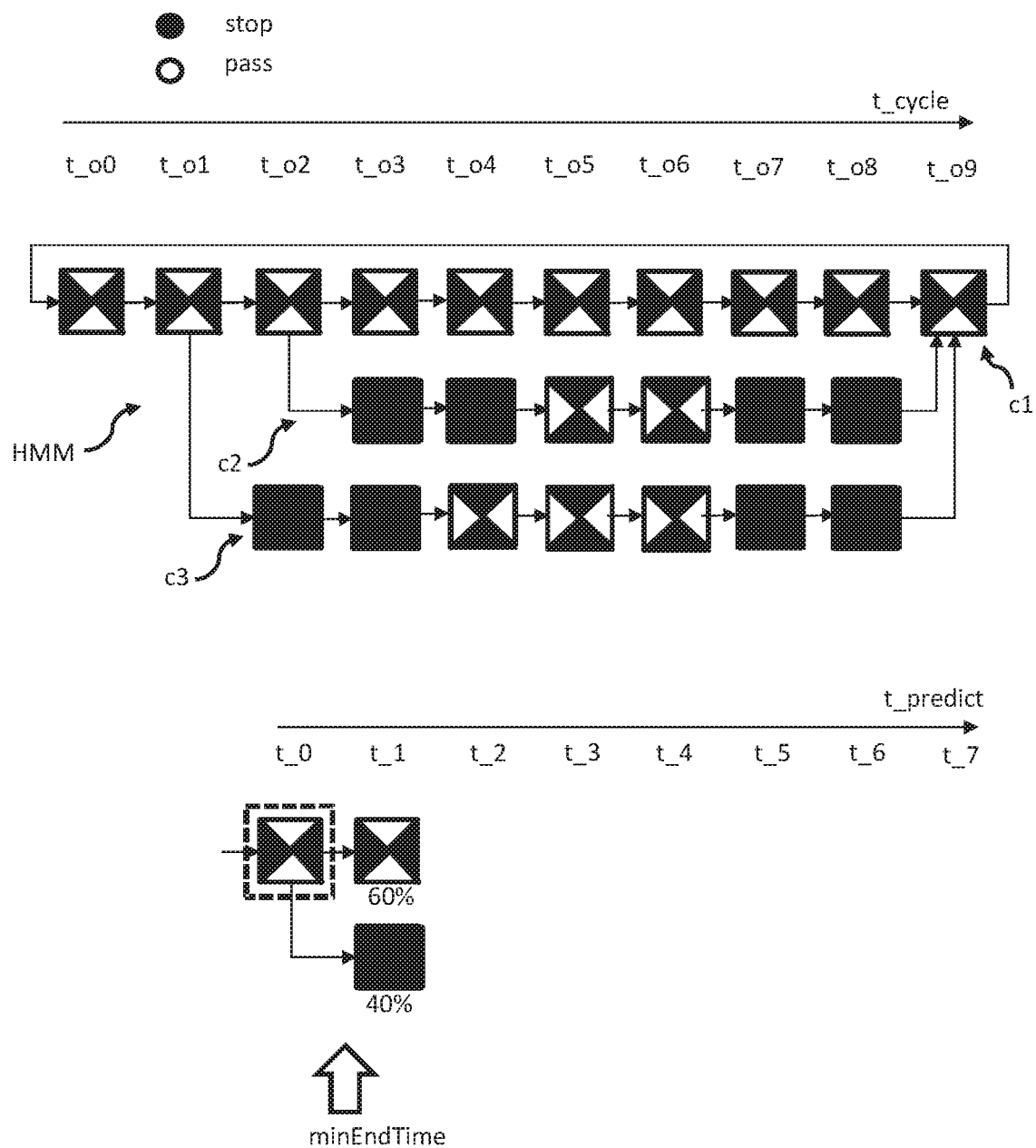

FIG. 4C shows the situation in the next cycle second. The current combined state (dashed frame still corresponds to the first combined state. That is, the signal analyzer knows that no transition has occurred into the third chain c3. Therefore, for the prediction of future transitions, the HMM can be reduced to the first and second chains c1, c2 as no further transition into c3 is possible. This implies that, from the cycle second t_o2 the probabilities for the hidden state transitions are updated. The current state at t_o2 was reached and therefore has a 100% probability. Therefore, the hidden state transition from c1 to c2 after t_o2 results in a probability of 60" for the current state to remain which is in any case far below the first threshold. As a result, the minEndTime is determined after the end of cycle second t_o2.

Figure 4D:
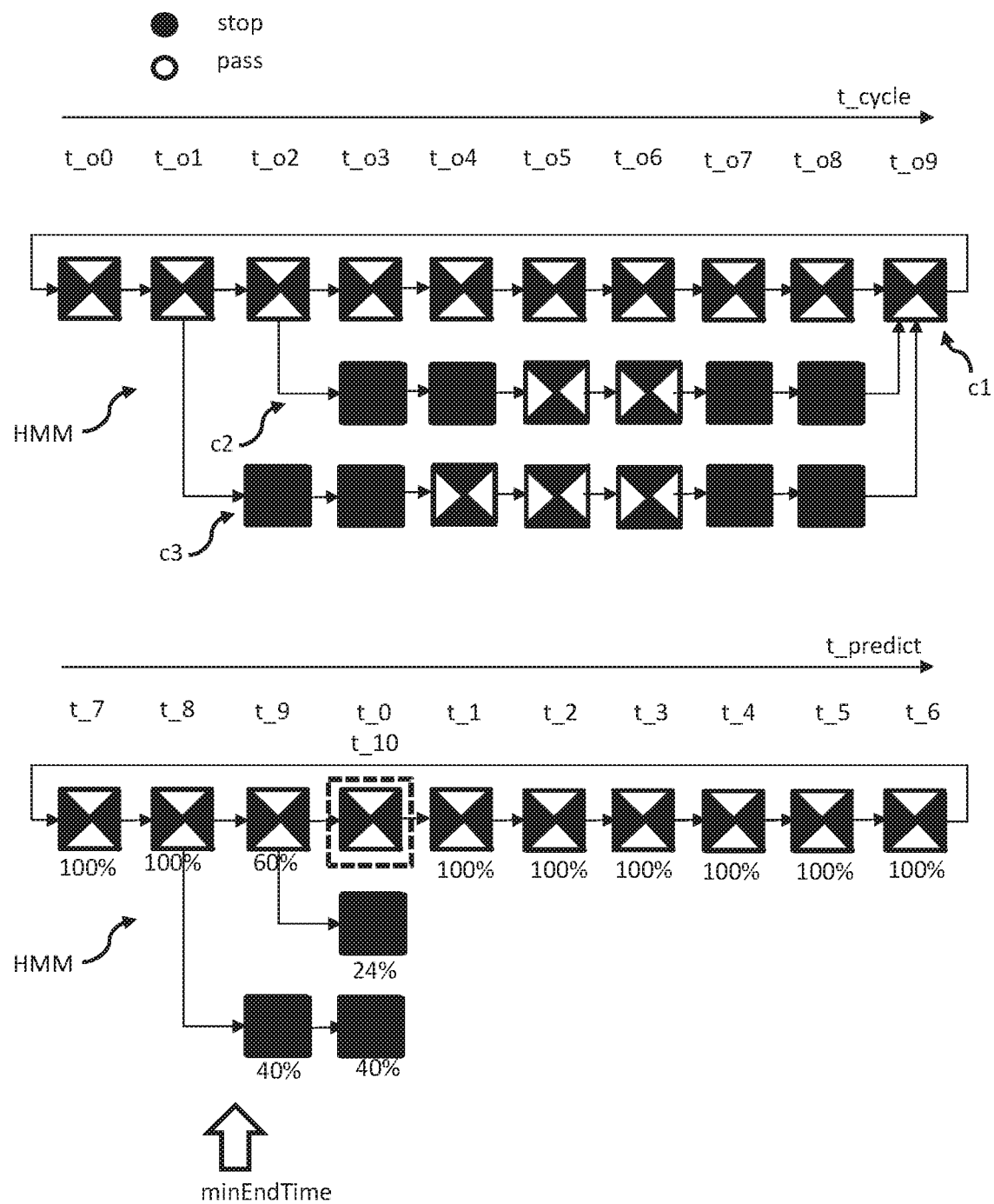

FIG. 4D illustrates the situation in the next cycle second t_o3 when the current state (dashed frame) still corresponds to the first combined stated. At this moment the signal analyzer recognizes that no further transition is possible during the rest of the switching cycle. As a consequence all remaining hidden states of the first chain c1 have a probability of 100% to remain in the current state. Therefore, the minEndTime can be determined after the end of the prediction interval t_8 which basically corresponds to the situation discussed in FIG. 4A when applied to the next switching cycle for the HMM.

Figure 4E:
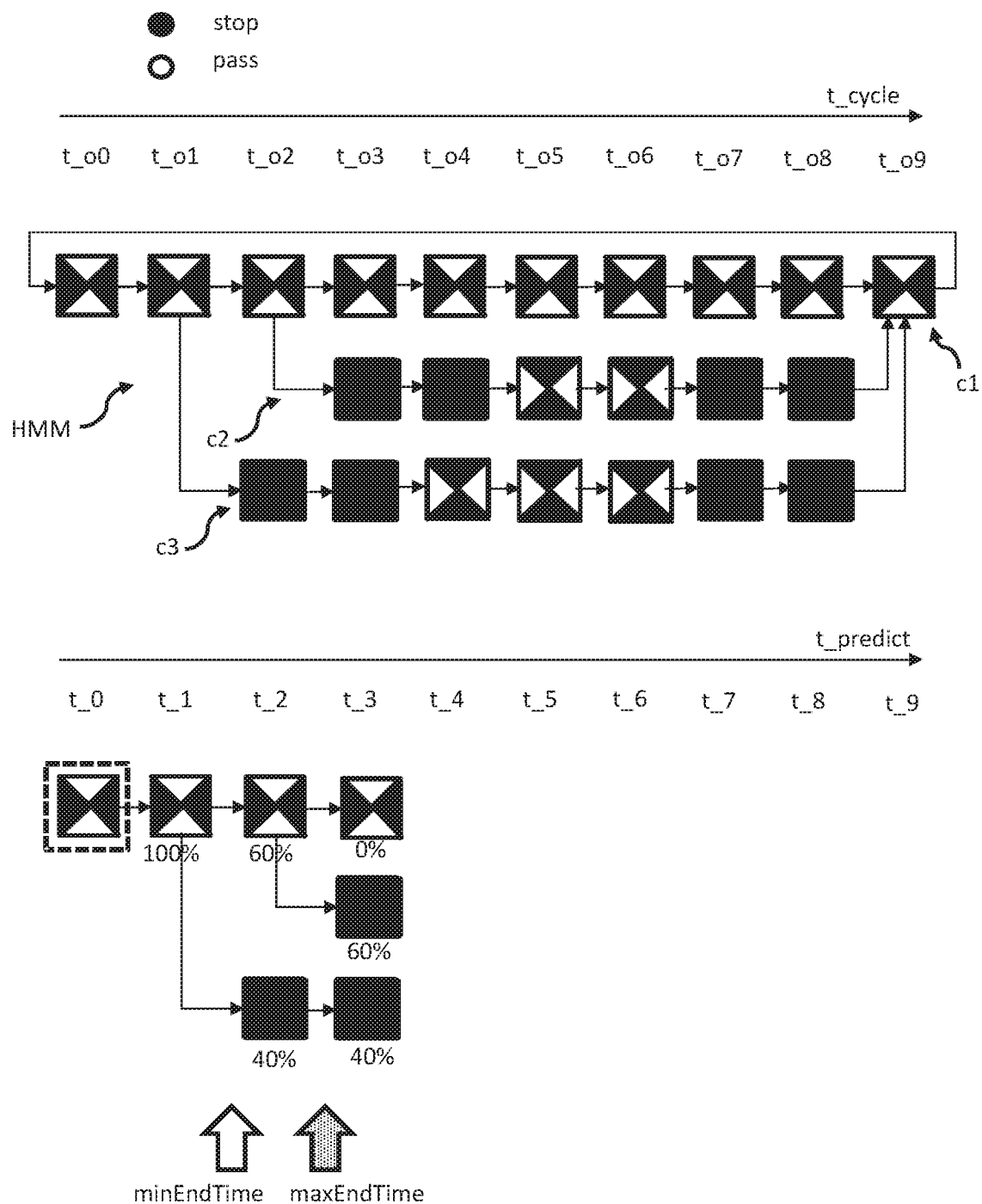
FIG. 4E illustrates an example determination of a minimum end time and a maximum end time at a particular sampling time point.

FIG. 4E illustrates an example for the determination of a minimum end time and a maximum end time. The situation corresponds again to the situation of FIG. 4A. The current state is the first combined state identified during the initial cycle second t_0 of the HMM. The determination of minEndTime has already been discussed in FIG. 4A. In this example, the signal analyzer can also determine a maximum end time maxEndTime. maxEndTime describes the earliest future time point when the traffic lights will switch to the second combined state with certainty. In case a vehicle is detected at t_0 the signal analyzer recognizes that a state switch will occur either to the second chain c2 at prediction interval t_2 or to the third chain c3 at prediction interval t_3. As the state switch is certain, the probability for the traffic lights to remain in the first combined state is zero (or at least below p=1−second threshold value). Therefore, the remaining 60% probability for the first combined state at t_2 can be transitioned into the probability for the transition to the second chain after t_2. The total probability (in the example) to switch to the second combined state can be 100% after the end of t_2. In general, the total probability to reach the second combined state after the end of t_2 exceeds the second predefined threshold indicating that the state transition will occur with certainty. As a result, the determined maxEndTime after the end of t_2 can be included in the SPaT message for the vehicle.

Figure 5A:
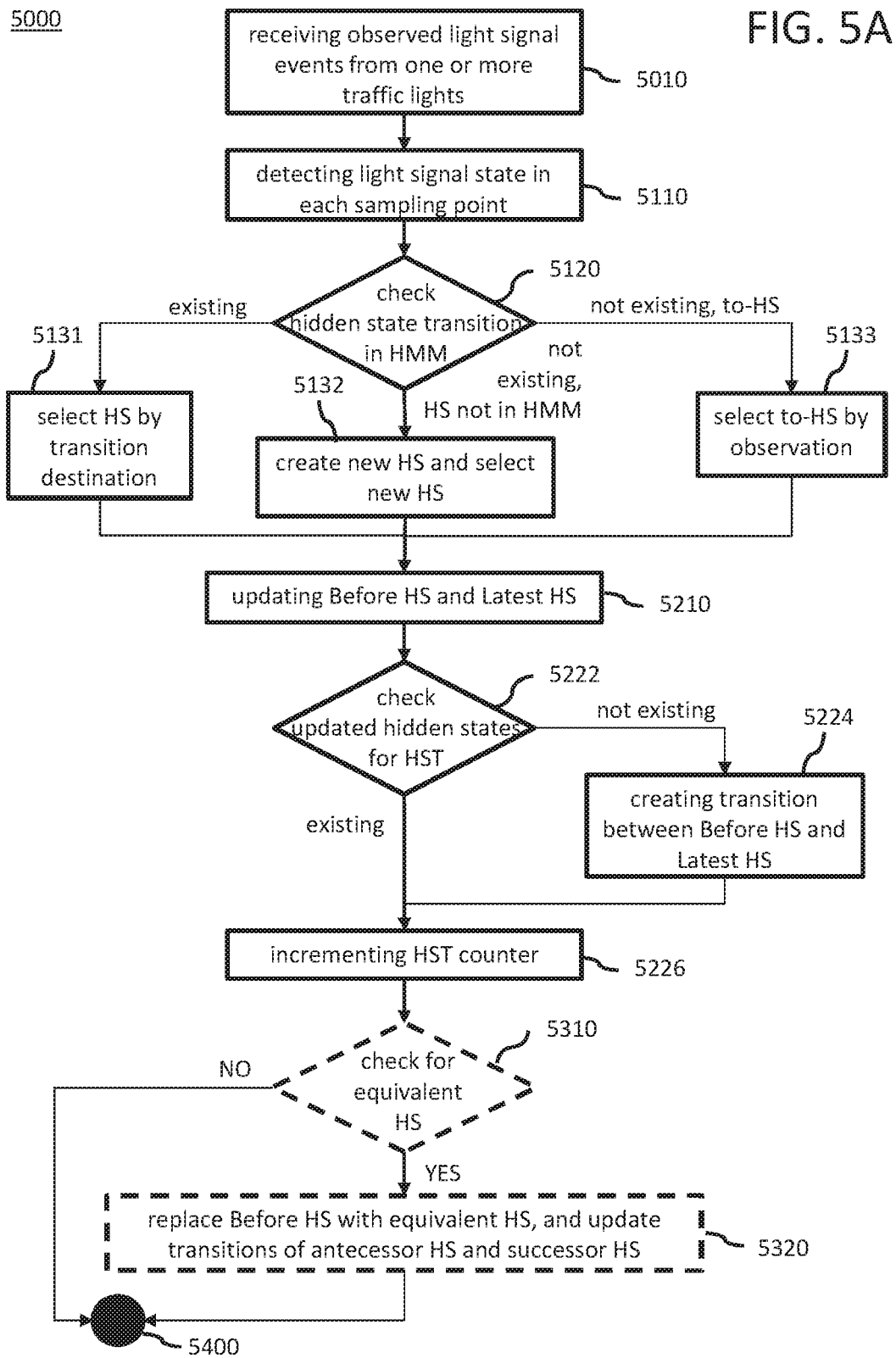
FIG. 5A is a flowchart of an example computer-implemented method for generating a Hidden Markov Model as a statistical model.

FIG. 5A is a simplified flowchart of an example computer-implemented method 5000 for generating a Hidden Markov Model as statistical model using, for example, training module 120. The method 5000 can be performed as part of the previously disclosed method 1000 to generate the HMM as the statistical model being used for the prediction of timing parameters. The method 5000 can also be executed as a stand-alone method to generate a HMM which reflects state switching probabilities for traffic lights.

The method 5000 can start (with the same receiving step 1100 as method 1000) by receiving switching state data from one or more traffic lights (5010), wherein switching state data of a particular traffic light includes as signal states at least a pass-state and a stop-state of the particular traffic light at respective sampling time points.

In method 5000, the light signal state is detected in each sampling time point. The sample represents the light signal state at one point in time and is sampled periodically to retrieve a time series of light signal states (5110). In the case a light signal state cannot be retrieved periodically, the light signal state may need to be reconstructed at the point in time of the sampling. For systems sending new state information only on state changes, this may be achieved by writing ahead the last-known state to the sampling point in time.

The training module 120 then checks for the current sampling time point if the detected state already exists as a hidden state (HS) in the Hidden Markov Model (5120). If the corresponding hidden state transition already exists, a hidden state is selected 1 by the destination of the hidden state transition (5131). If the hidden state transition (HST) is not existing but the received state data can be explained by an existing hidden state, then the existing hidden state is selected (5133). If the hidden state transition does not exist and a corresponding hidden state is not in the Hidden Markov Model, the training module 120 creates a new hidden state corresponding to the received current switching state and selects the new hidden state (5132).

The training module 120 processes sampled states iteratively. A particular before-hidden-state stores the latest-hidden-state of the previous iteration. The latest-hidden-state can be selected and then stored in a respective latest-hidden-state variable. The training module updates the before-hidden-state with the latest-hidden-state of the last iteration and the latest-hidden-state with the selected hidden state (5210). If no transition exists between the before-hidden-state and the latest-hidden-state (cf. check 5222) the training module creates a transition between the respective before-hidden-state and the latest-hidden-state (5224). Finally, the training module 120 increments a hidden state transition counter between the before-hidden-state and the latest-hidden-state (5226). That is, the transition counter of a respective hidden state transition is incremented each time the transition explains the actually observed signal states in the received training data.

In one implementation, the training module 120 performs a reduction of the hidden states in that before-hidden-states are replaced with equivalent hidden states of the HMM. In this implementation, the training module checks if there is a hidden state in the HMM which has an equivalent observation and the same successor HS (5310). If such an equivalent HS exists the before HS is replaced by the equivalent HS and the transitions of the antecessor HS and successor HS are updated (5320). The before-HS and all its transitions can be removed from the model to reduce the model size. A HMM generation cycle of method 5000 ends at 5400 from where it can restart with receiving the next observed light signal event at the next sampling time point 5010 until the HMM is sufficiently trained for prediction use.

Figure 5B:
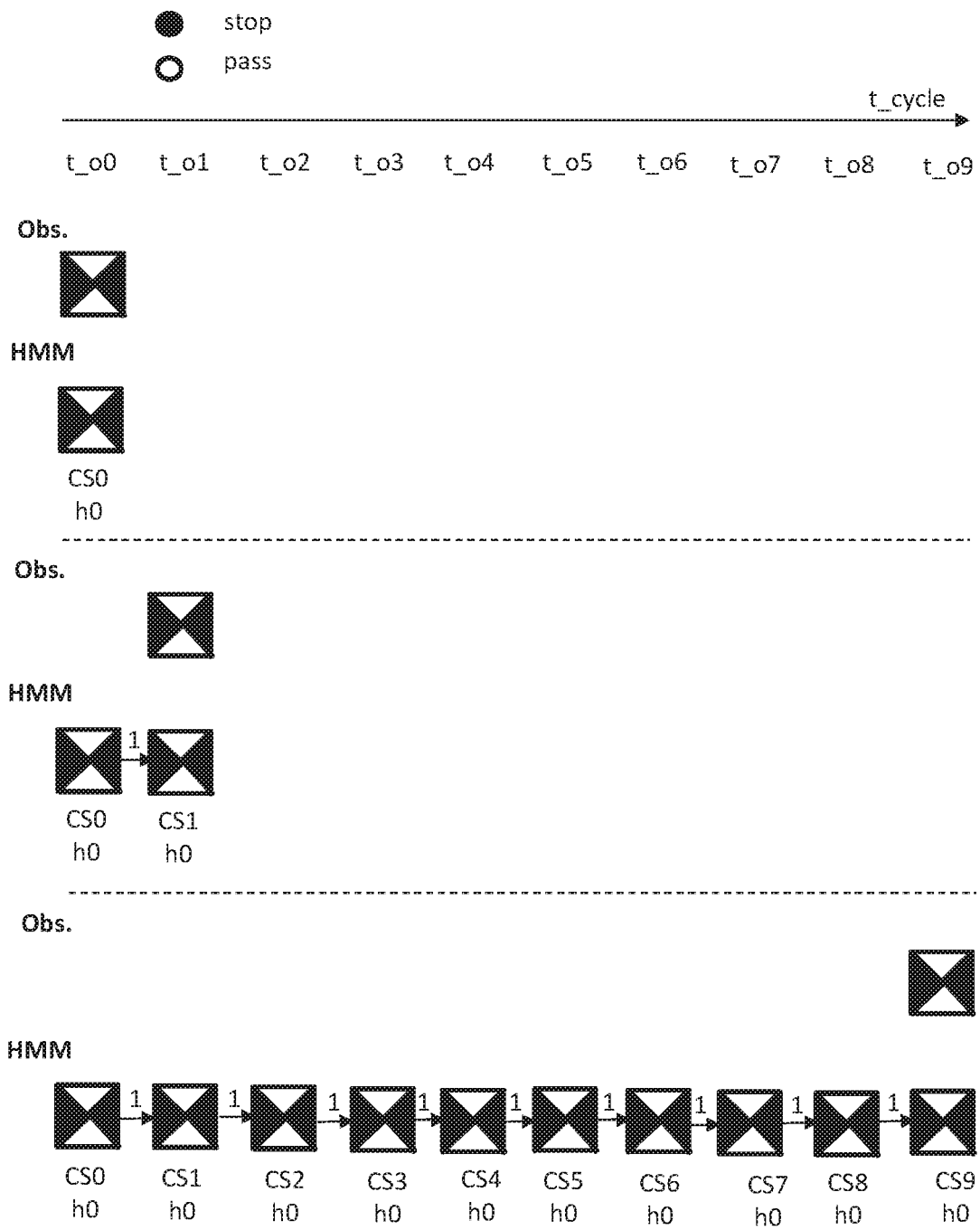
FIGS. 5B to 5D illustrate an example of generating a particular HMM as the statistical model at different sampling time points.
Figure 5C:
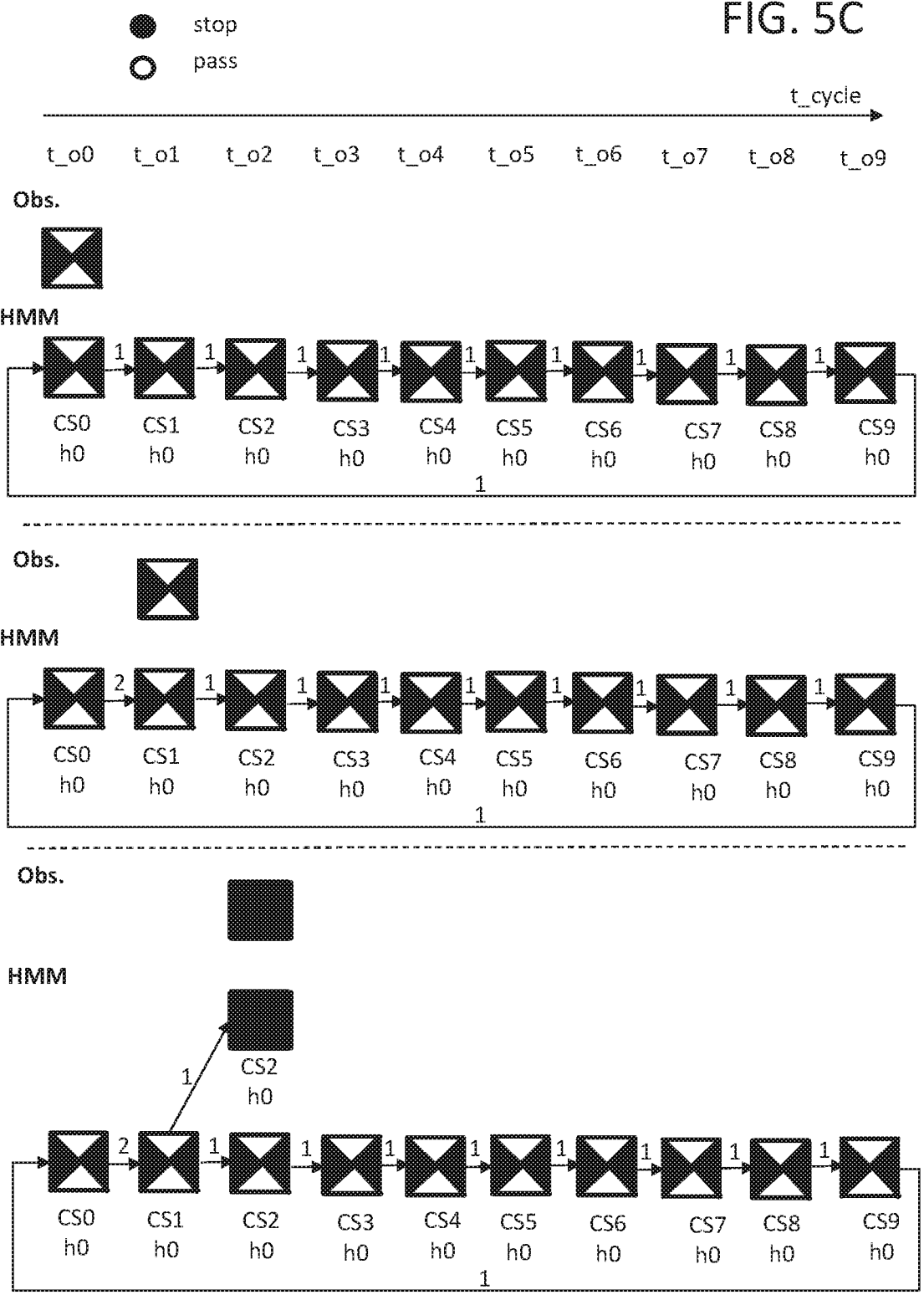
Figure 5D:
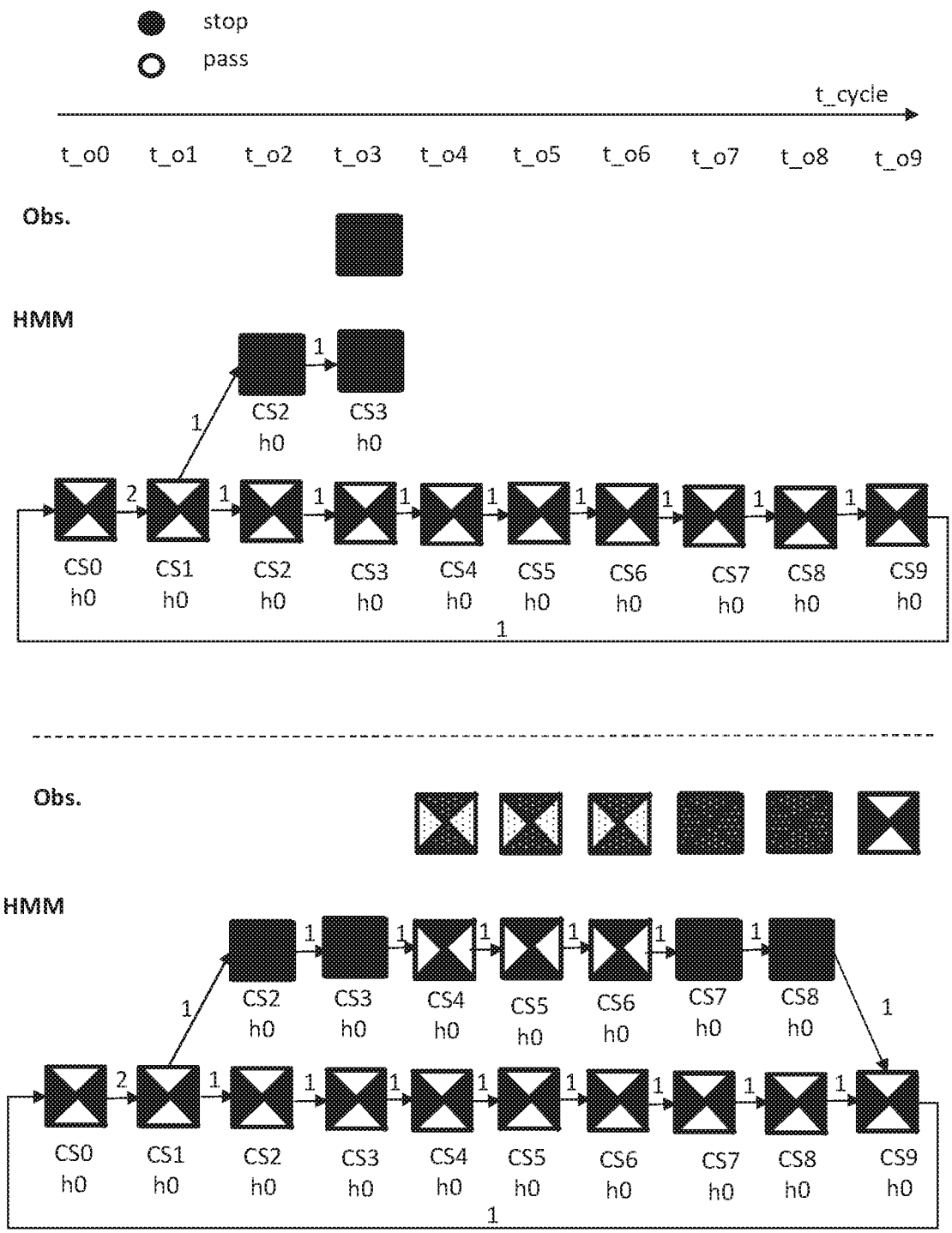

FIGS. 5B to 5D illustrate an example of use of method 5000 in generating a particular HMM as the statistical model at different sampling time points illustrated by the cycle seconds t_o0 to t_o9. Each of figures is separated into multiple portions by horizontal dashed lines. Each portion illustrates what happens at the respective sampling time point. The upper row in each portion shows the observed combined state (section Obs.) which is detected at the current sampling time point. The lower section HMM in each portion illustrates how the HMM is modified/updated based on the observed combined state.

In FIG. 5B, in the upper portion, the first combined state is observed at t_o0. It is assumed, that the HMM is empty at this time point when the first combined state is received. Therefore, the HMM in cycle second t_o0 has no hidden state and no transition. As a consequence, steps 5131, 5133 fail. However, step 5132 succeeds. A new HS CS0 with hidden ID h0 is generated for cycle second t_o0. As there are no transitions in the HMM, yet, no update step 5210 (and no reduction 5310, 5320) can be performed.

In the middle portion the first combined state is again received at t_o1. Again, steps 5131, 5133 fail because the HMM does not have a HS for the observation. However, step 5132 succeeds. A new HS CS1 with hidden ID h0 is generated for cycle second t_o1. This time, there is a transition to CS1 from CS0. Therefore, the update step 5210 can be performed. The newly created HS CS1 is set as the latest HS and the previously created HS CS0 is set as the before-HS. A transition (arrow) is added between the before-HS and the latest HS and a transition counter for this transition is incremented (resulting in 1 as the transition was observed for the first time).

In the lower portion, the situation is illustrated for the first combined state received at t_o9. It is assumed that the first combined state was also observed for the cycle seconds t_o2 to t_o8. The hidden states CS2 to CS9 were all created according to the same procedure as HS CS1. Also the updating of the before-HS and latest HS as well as the creation of the respective transitions and the incrementing of the respective hidden state transition counters are analogously performed. At the end of t_o9 the first chain of the HMM is generated.

FIG. 5C illustrates the first three sampling time points during the second switching cycle. In the upper portion, again, the first combined state is observed/detected at t_o0. The absolute time for this sampling time point is 10 cycle seconds later than the initial sampling time point during the first switching cycle. Step 5131 still fails because there is no transition yet between CS9 and CS0. However, step 5133 succeeds because HS CS0 can create the observation. As a consequence CS0 is selected and set as the latest HS whereas CS9 is set as the before-HS. The corresponding transition is added and the respective hidden state transition counter is incremented. With regards to a possible reduction, there are still no hidden states with same observation but a different ID. So far in this example only one layer (chain) of hidden states has been generated in accordance with the observed combined states.

In the middle portion, the observed state at t_o1 is again the first combined state. This time, step 5131 succeeds because CS1 can create the observed state (vertical pass-state) and there is already a transition between CS0 and CS1. Therefore, the update step 5210 increments the hidden state transition counter of the identified transition resulting in a counter value of 2.

In the lower portion, at t_o2 of the second switching cycle, the second combined state (all stop-state) is received/observed. Therefore, steps 5131 and 5133 fail because the HMM at this stage has no hidden state which can create the observation, nor does it have a corresponding transition. Therefore, step 5132 creates the new hidden state CS2 (all_stop) with hidden ID h0 which also is updated as the latest-hidden-state. In the update step 5210 a new hidden state transition is added between the before-hidden-state CS1 (vertical_pass) and the latest HS and the respective transition counter is incremented to 1.

In FIG. 5D, in the upper portion, at t_o3 of the second switching cycle again the second combined state is received/observed. According to the flow chart of FIG. 5A, a corresponding new HS CS3 (all_stop) is added. The corresponding transition is added and the respective transition counter value is incremented.

In the lower portion, at t_o9 of the second switching cycle, again the first combined state is received/observed. The Obs. Row further illustrates the combined states which had been received previously from t_o4 to t_o8 of the second switching cycles. The previously received combined states are illustrated by a dotted texture. From t_o4 to t_o6 the third combined state (horizontal pass_state) was received. Accordingly, the training module 120 generates the new hidden states CS4 (hor_pass) to CS6 (hor_pass) with the respective transitions and counter incrementing. Then, for the next two cycle seconds, the second combined state was received again resulting in the new hidden states CS7 (all_stop) and CS8 (all_stop). At t_o9, step 5133 succeeds, because CS9 as destination can create the observation. The before-HS and the latest HS are updated accordingly and the corresponding transition is added and the respective counter is incremented.

Figure 5E:
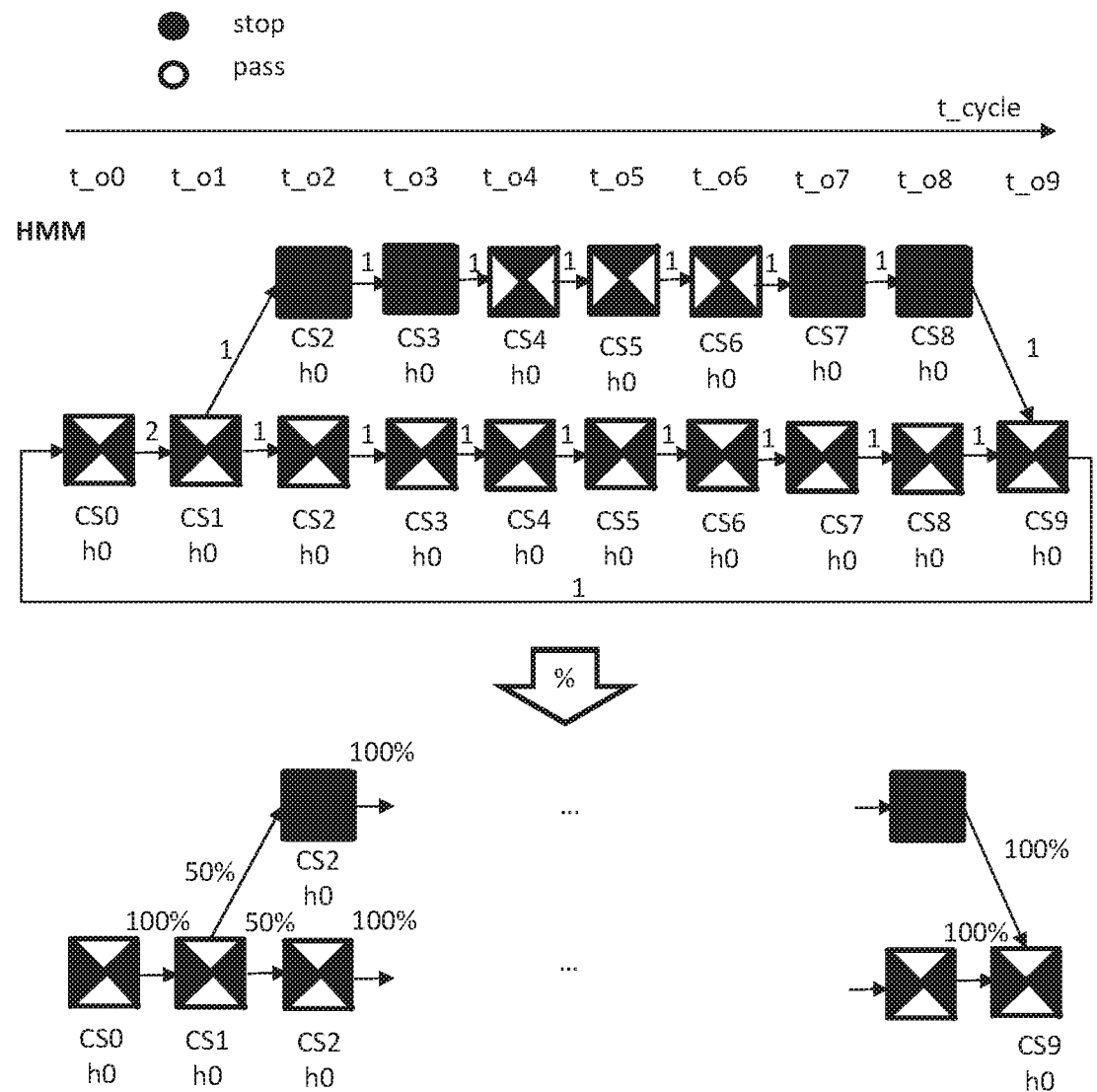
FIG. 5E illustrates an example derivation of probabilities for state transitions from the generated HMM.

The building and updating of the HMM according to the method of FIG. 5A can be continuously performed even in parallel while calculating predictions to the use of the HMM as statistical model in method 1000. FIG. 5E illustrates example derivation of probabilities for state transitions from the generated HMM which can occur simultaneously to the operation of the computer system 100 in accordance with the method 1000 of FIG. 2.

The generated HMM is again shown in the upper part of FIG. 5E. The lower part explains how the probabilities for state transitions between hidden states can be determined based on an evaluation of all hidden state transition counter values between two subsequent cycle time points in the HMM. The hidden state transition counter values reflect how often the respective state transition occurred during the generation of the HMM. In the example, only two switching cycles are performed. To arrive at a statistical model with high prediction accuracy, a statically relevant number of switching cycles would be performed. That is, the respective counter values represent statistically relevant sampling results, once the HMM has been trained for an appropriate level of prediction accuracy. However, the principle of the probability determination can be readily understood by looking at the HMM after two switching cycles. All transitions with the exception of the transition CS0→CS1 occurred only once (counter value=1) in the so far observed switching states. The transition CS0→CS1 occurred twice (counter value=2). The probability for a particular transition at a given cycle second can now be computed by dividing the respective counter value by the sum of all counter values for transitions existing in parallel for the given cycle second. For example, for the transition CS0→CS1 the counter value is 2. There are no further transitions in the HMM between t_o0 and t_o1. Therefore, the sum of all counter values is 2. As a result, the probability p for the hidden state transition CS0→CS1 is p=2/2=1 (100%). When looking at the transitions from t_o1 to t_o2, two alternative transitions exist: CS1→CS2 (vertical_pass) and CS1→CS2 (all_stop). As a result, the counter value for each of the transitions is 1. The sum of counter values for all transitions between t_o1 to t_o2 is 2. As a result, the probability for each of the alternative transitions is p=1/2=0.5 (50%). The other transition probabilities can be determined analogously. This method for determining the hidden state transitions probabilities is advantageous because it can be updated on the fly while the HMM is being built/updated and the probabilities are determined with high accuracy as no rounding operations need be performed up until the last step of calculating the probabilities. Thus, unlike traditional systems, floating point numbers rounding errors can be kept as low as possible. That is, whenever a counter value is updated, the respective updated probabilities for alternative transitions affected by the update are immediately recomputed with the maximum possible accuracy. Rounding may be applied to computed probabilities but the probabilities are not determined based on any rounded values which guarantees highly accurate updating of transition probabilities in real time.

Figure 6:
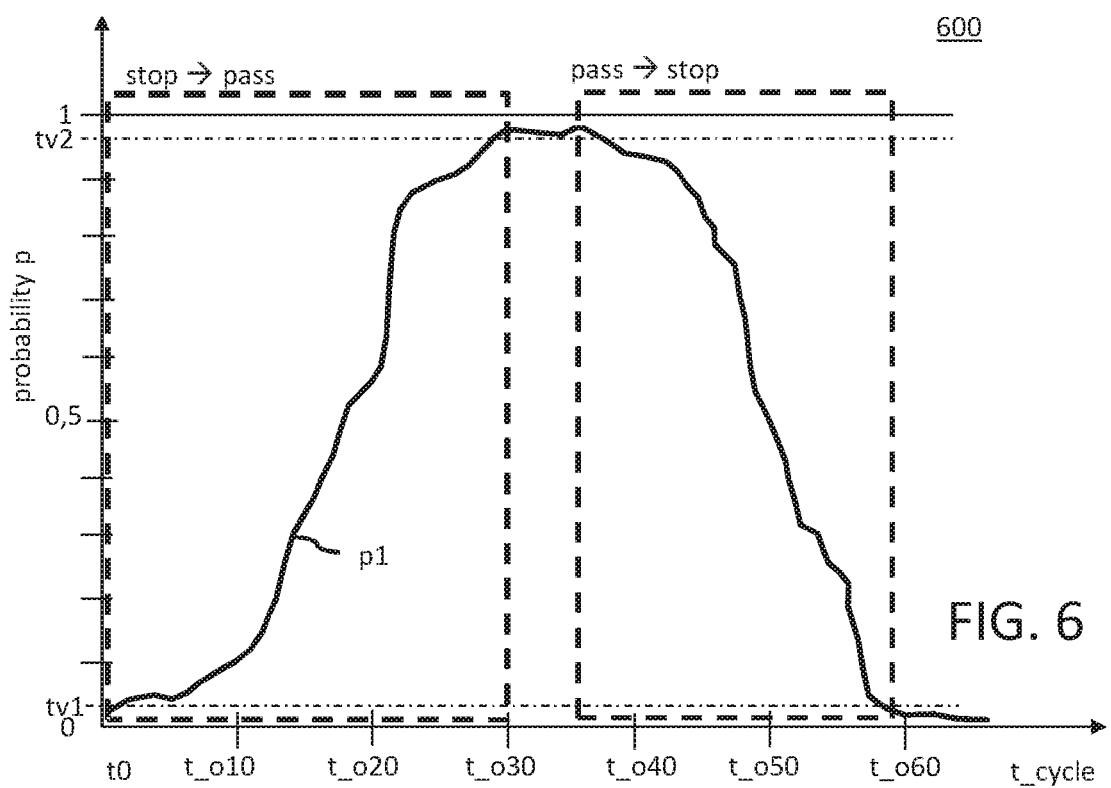
FIG. 6 illustrates an example of a real-world probability curve for state changes of a traffic light.

FIG. 6 illustrates an example diagram 600 of a real-world probability curve p1 for state changes of a traffic light. The length of the switching cycle in the example is approximately 60 seconds from t0 to t_o60. The stop→pass dashed frame on the left indicates a time period of approximately 30 seconds during which the probability to switch from the stop state to the pass state continuously rises from approximately 2% to approximately 98%. That is, at t0, the traffic light is in the stop state. As long as the probability for a state transition into the pass state is below tv1 the stop state is perceived as certain. Shortly after t0 the probability to switch to the pass state exceeds tv1 (~3%). In other words the probability to remain in the stop state falls below the first threshold value (in this case ~1−0.03=97%). This point in time defines the minimum end time for the stop state. Shortly before t_o30, the probability to switch to the pass state exceeds the second threshold value tv2 (~97%) which indicates the maximum end time for the stop state.

In the pass→stop dashed frame on the right, there is a time period of approximately 23 seconds during which the probability to remain in the pass state continuously decreases from approximately 98% to approximately 2%. During the approximately 5 seconds between the two frames the probability exceeds the second threshold tv2 indicating that during this time period the pass state is certain. For the state transition in the right frame tv2 now becomes the first threshold with regards to the minimum end time for the pass state. Once the probability falls below tv2 the pass state is not maintained with certainty and the minimum end time is determined at this point in time. The maximum end time for the pass state is reached, when the probability indicates certainty for the stop state which occurs when the probability to switch to the stop state exceeds the second threshold value which is in this case 1−tv1.

FIG. 7A is an illustration of an example statistical model 710 generated on the basis of historic state data records 711. Statistical model 710 includes averaged probabilities p_t of one or more signal states r_t, g_t (in the example of the pass state g) for each sampling interval within a switching state data cycle. For generating the statistical model 710, the training module 120 records a statistically relevant sized sample of switching state data cycles. The number and durations of the switching state data cycle records can be selected according to well-established statistical rules and principles to allow statistically relevant calculations. In the example, the length of the switching cycle is again 10 cycle seconds. The data records 711 illustrate three example data records of three subsequent switching cycles where the captured state at each cycle second is illustrated via the texture of the respective cycle second rectangle. A dotted rectangle represents the stop state r, and a white rectangle represents the pass state g. For each data record of a particular switching cycle the respective start time is identified (e.g., 0:00 for Record 1, 0:10 for Record 2 and 0:20 for Record 3). The rows r_t and g_t of the statistical model 710 include the total number of state occurrences of the stop/pass states, respectively, in all recorded data records for the corresponding cycle seconds. In other words, the sampled switching state data having the same time offsets from the respective cycle start times are added with regards to the respective state r, g in the cycle second fields r_t, g_t. In the cycle seconds 0 to 3 only stop states are recorded. Therefore, r_t=0 and g_t=0. In cycle second 5 in record 2 the pass state is detected resulting in r_t=2 and r_g=1, and so on.

Based on the total state occurrences the probability p_t for the pass state g can be derived for each cycle second. For the first four cycle seconds p_t=0/3=0. For the cycle second 4 the probability rises to p_t=1/3=33%. In cycle seconds 6 and 7 only pass states are recorded leading to a probability p_t=3/3=100%, and so on.

FIG. 7B illustrates the determination of minimum end times MinET and maximum end times MaxET based on the further statistical model 710. In the example cycle second 4 is the first interval where the a probability for the pass state is greater zero (0.33). That is, the probability for the current stop state (1−0.33=0.67) falls below the first threshold indicating that the stop state is not certain anymore after cycle second 3. This defines the minimum end time MinETrg (indicated with x). The maximum end time MaxETrg for the stop state is determined over cycle second 5 because in cycle second 6 the pass state becomes certain (probability 1 exceeds second threshold). The minimum end time MinETgr for the pass state is reached after cycle second 7 which is the last interval where the pass state is certain (probability 1). The maximum end time MaxETgr for the pass state is after cycle second 8 because cycle second 9 is the first interval where the stop state becomes certain again.

Figure 8C:
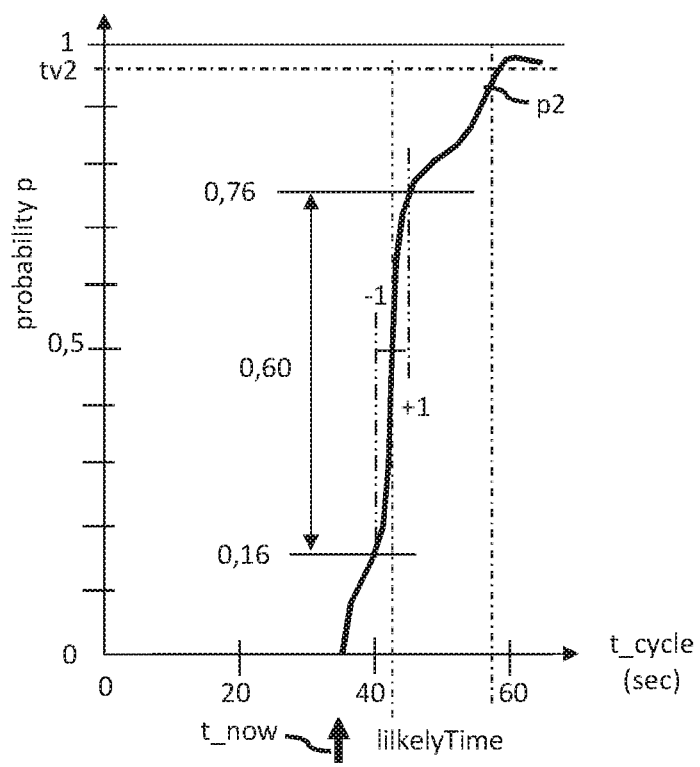
FIGS. 8A to 8C illustrate an example determination of a likelyTime and corresponding confidence values at different points in time.
Figure 8A:
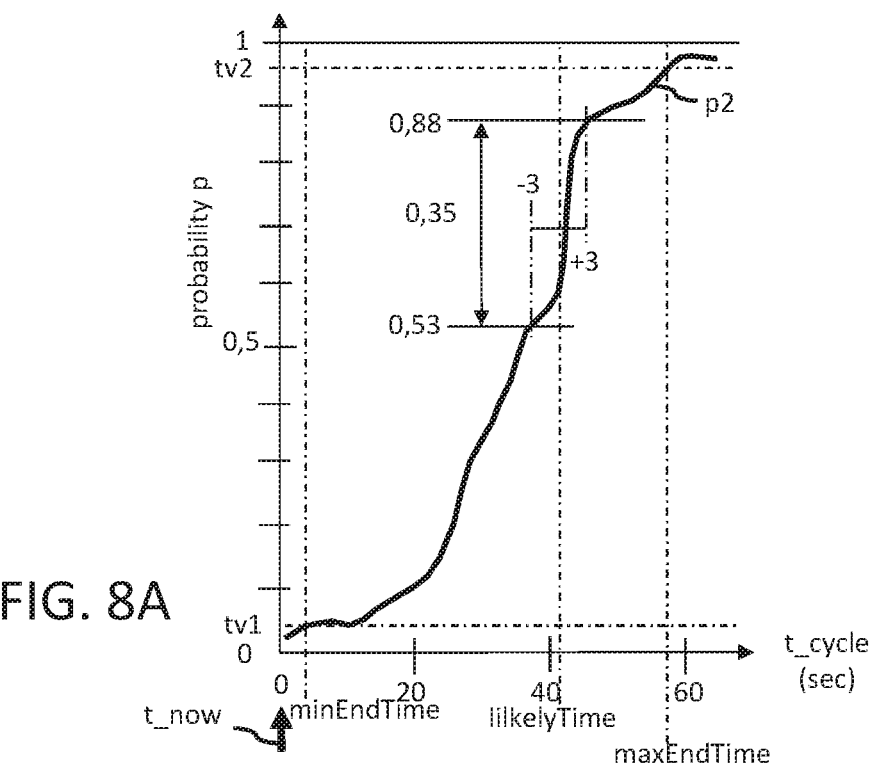
Figure 8B:
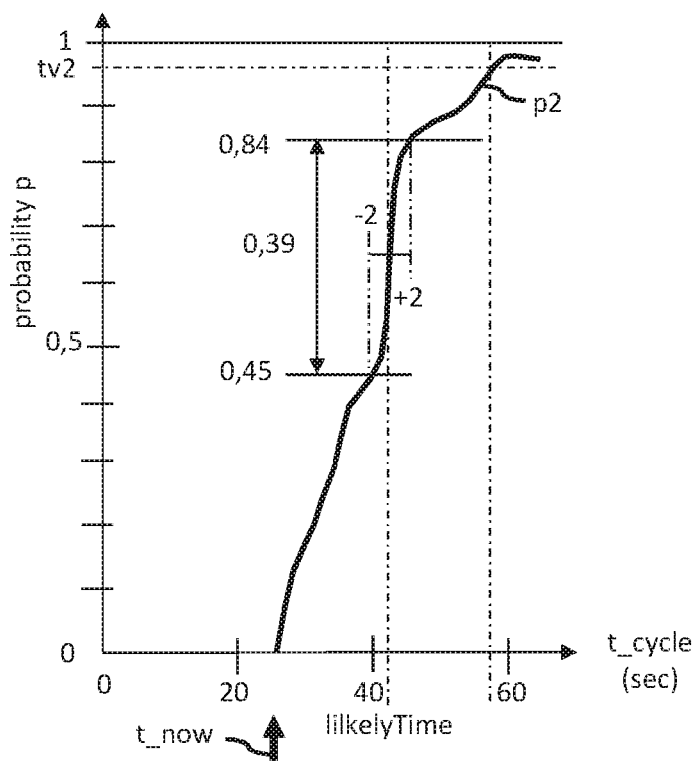

FIGS. 8A to 8C illustrate an example for the determination of a likelyTime and the corresponding confidence values at different points in time for system implementations having a likelyTime module 144. FIG. 8A shows a probability curve p2 which is determined from a respective statistical model and which predicts the switching behavior of an example traffic light signal to switch from the current stop to the pass state for the next approximately 60 sec. The arrow t_now indicates the current time at 0 sec. The computer system 100 has determined minEndTime and maxEndTime for the state transition from stop state to pass state. The likelyTime in this example is determined as the point in time where the probability delta within a given time window around the likelyTime is highest. The probability delta can be interpreted as a confidence value with regards to the confidence that a signal switch will occur during the respective time window around the likelyTime. In other words, the likelyTime is determined for the time point in the center of the time window with the highest confidence value for the respective signal switch. Typically, the closer the likelyTime is to the current time point t_now the smaller the width of the time window is selected to improve the accuracy of the prediction. The time window for the determining the confidence values can be seen as a tolerance range wherein the accuracy of the prediction increases with a decreasing tolerance range. In some implementations, other algorithms, like the cycle second during which most signal switches happened, can also be use to determine the likely time. It is common practice that the prediction accuracy for predictions up to 10 sec into the future is required to be +/−1 sec (i.e. a two seconds time window). For predictions between 10 and 20 seconds, typically a prediction accuracy of +/−2 sec (i.e. a 4 seconds time window) is required. For predictions beyond 20 sec, typically a prediction accuracy of +/−3 sec (i.e. a 6 seconds time window) is required. Other prediction accuracy requirements associated with different time windows may be appropriate in view of respective real world application scenarios.

In the example, the likelyTime is more than 30 sec into the future at approximately 42 seconds. With a time window of +/−3 sec set around the likelyTime, the associated probabilities for the start and end points of the time window are determined from the probability curve p2 to be 0.88/0.53 respectively. The difference 0.35 between those probability values can be a seen as a measure for the confidence with which a state transition from stop state to pass state will occur during the respective time window of 6 sec around the likelyTime. The likelyTime value (42 sec) and the corresponding confidence value (0.35) may then be included in the SPaT message in addition to the minEndTime and maxEndTime values to be provided to the vehicle at t_now.

FIG. 8B illustrates a situation approximately 26 seconds later compared to FIG. 8A. The minEndTime has passed without a state transition being observed. That is, the traffic light is still in the stop state. Therefore, the probability curve p2 can be adjusted to reflect that the current state is still in the stop state which means that the probability for the pass state is still zero at t_now in FIG. 8B. In the example, the probability curve p2 is linearly stretched along the p axis for the statistic approach as disclosed in FIGS. 7A, 7B. In other words, at t_now of FIG. 8B, the remaining probability curve p2 is linearly stretched in such a way that p2(t_now)=0. That is the remaining probability curve is re-scaled to cover the whole range of probabilities from 0 to the maximum probability value of the original curve. However, other re-adjustments of the probability curve may be performed. The likelyTime is re-computed at approximately 43 sec with the shortened time window (width: 4 sec) because the current t_now (approximately at 26 sec) is only approximately 17 seconds before the re-computed lilkelyTime. Therefore, according to the example embodiment, the prediction accuracy is higher reflected by the shortened time window (4 s). The confidence value associated with the shortened time window is computed as 0.39. A SPaT message provided to the vehicle at the current t_now may therefore include the additional information likelyTime=17 sec, confidence value=0.39.

In FIG. 8C, the time has progressed another 10 sec (t_now=36 s). Now the likelyTime recomputed with the 2 s time window is less than 10 seconds into the future. That is, the time window is reduced to two seconds for getting an even higher prediction accuracy for the expected state transition. Because the state transition has not occurred so far the probability curve p2 is again re-calculated to reflect that at the current t_now the probability for the pass state is still zero. The likelyTime module 144 of the computer system 100 determines a corresponding confidence value of 0, 60. That is, at t_now=36 sec the confidence that a state transition occurs within the 2 sec likelyTime window is 60% and the SPaT message provided to the vehicle at the current t_now may therefore include the additional information likelyTime=7 sec, confidence value=0.60.

It is noted that the example of FIGS. 8A to 8C corresponds to the statistical model used in FIGS. 7A, 7B. When performing the likelyTime computation with a HMM approach the following may be taken into account: The probability curve needs to be re-calculated when t_now changes. The probability curve is derived by traversing the HMM starting at latest-hidden-state (the hidden state at t_now), following the transitions to successor hidden states and aggregating the signal color per signal and cycle second weighted by the transition probability. Based on this aggregate, a probability curve per signal is derived.

In an alternative embodiment, the likelyTime and a corresponding confidence value for the state transition is estimated by a Support Vector Machine (SVM) approach. SVM can be used to predict signal switches.

In some embodiments, for example where the likelyTime is computed with HMM or SVM approaches, the signal analyzer may validate the consistency of the computed values before the respective SPaT message is provided to the vehicle. The values can be validated as being consistent if the minimum end time is smaller or equal the likely time and the likely time is smaller or equal the maximum end time.

Figure 9:
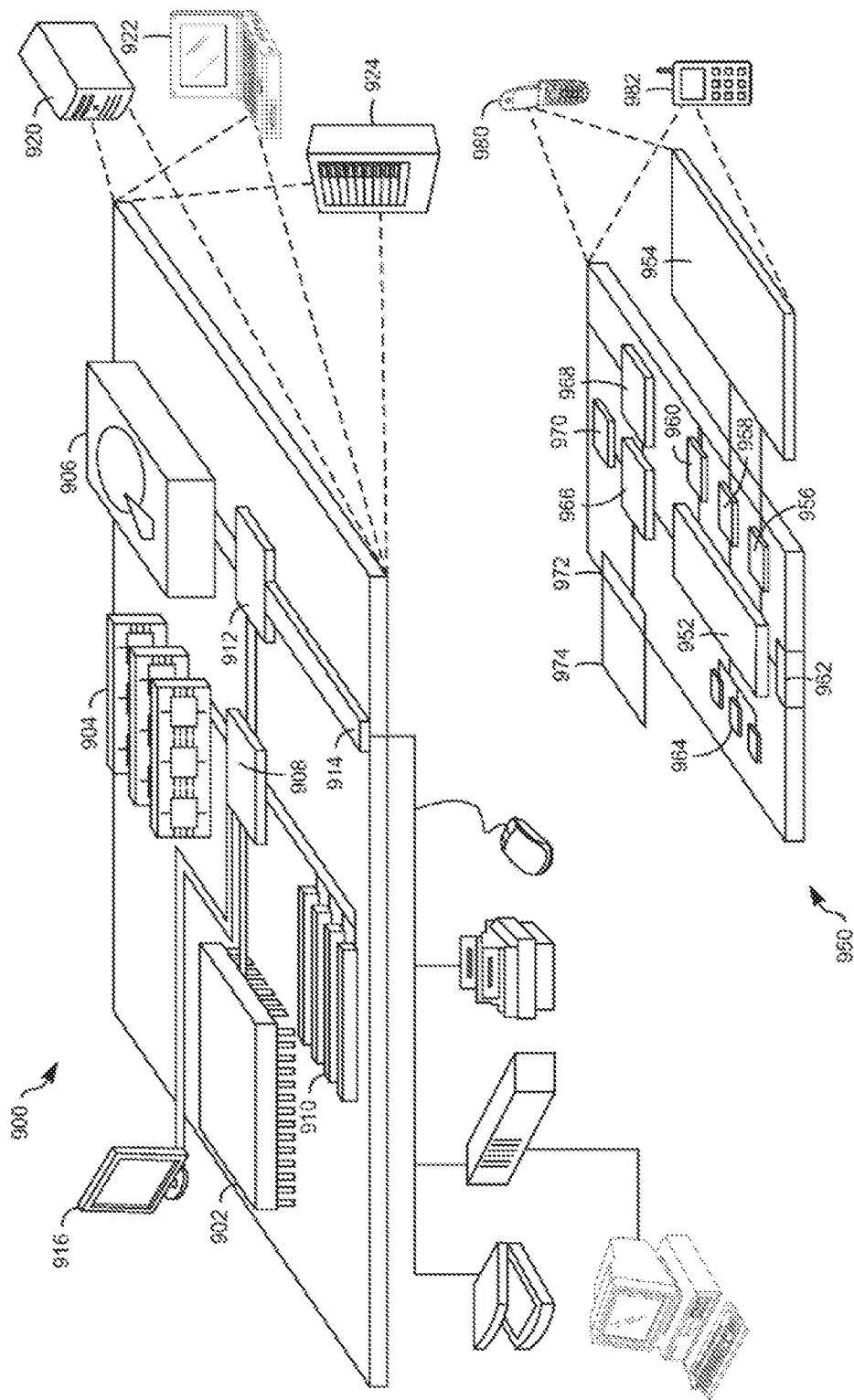
FIG. 9 is a schematic diagram of an example computer device and an example mobile computer device, which may be used to implement the techniques described herein.

FIG. 9 is a diagram that shows an example of a computer device 900 and a mobile computer device 950, which may be used to implement the techniques described here. Computing device 900 may represent various forms of digital computers, such as laptops, desktops, workstations, personal digital assistants, servers, blade servers, mainframes, and other computers. Computing device 900 may correspond to the computer system 100 of FIG. 1. Computing device 950 may represent various forms of mobile devices, such as personal digital assistants, cellular telephones, smart phones, driving assistance systems, drive controllers, or board computers of vehicles (e.g., vehicles 401, 402, 403, cf. FIG. 1) and other similar computing devices. For example, computing device 950 may be used as a frontend by a user to interact with the computing device 900. The components shown here, their connections and relationships, and their functions, are meant to be exemplary only, and are not meant to limit the implementations described herein Computing device 900 may, for example, include a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, may be interconnected using various busses, and may be mounted on a common motherboard or in other manners. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be (or contain) a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a non-transitory information carrier. The computer program product may also contain instructions that, when executed, perform one or more methods, such as those described above. The non-transitory information carrier can be a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer system providing Signal Phase and Timing (SPaT) messages to control operation of a vehicle, wherein the SPaT messages include reliable timing parameters to influence the operation of the vehicle, the computer system comprising:
    an interface component configured to receive switching state data of a traffic light control system on one or more traffic lights via a network which communicatively couples the computer system with the traffic light control system, wherein switching state data of a particular traffic light includes signal states comprising at least a pass-state and a stop-state of the particular traffic light at respective sampling time points, and further configured to provide a SPaT message to the vehicle;
    a signal analyzer component configured to perform a sequence of analysis steps for prediction intervals having the same length as the sampling intervals by:
        identifying the current signal state of the one or more traffic lights;
        deriving, from a statistical model trained on the basis of historic state transitions of the one or more traffic lights, probabilities for future state transitions from the current state into a different state for one or more future prediction intervals;
        determining a minimum end time point as the start of the nearest future prediction interval where the probability of the current state falls below a predefined first threshold value, the minimum end time point being the earliest point in time for a state transition from the current state to the different state;
        checking if a maximum end time point can be identified by checking if the probability of the different state exceeds a predefined second threshold value in a respective prediction interval; and
        if the maximum end time point can be identified, determining the maximum end time point as the start of a further nearest prediction interval where the probability of the different state exceeds the predefined second threshold value, the maximum end time point being the latest point in time for a state transition from the current state to the different state wherein the maximum end time point occurs after the minimum end time point; and
    a message composer component configured to compose the SPaT message including the determined minimum end time point, and if the maximum end time point is determined, to compose the SPaT message including the determined maximum end time point.

2. The computer system of claim 1, wherein,
    if the probability of the different state exceeds a predefined second threshold value, the signal analyzer is further configured to:
        estimate a likely time and a corresponding confidence value for the particular state transition; and
    if the maximum end time is determined, the message composer is further configured to compose the SPaT message including the estimated likely time and the corresponding confidence value.

3. The computer system of claim 1, further comprising:
    a training module configured to generate and train the statistical model based on switching state data received from the one or more traffic lights.

4. The computer system of claim 3, wherein the statistical model is a Hidden Markov Model representing potential state transitions of the one or more traffic lights with respective probabilities within a switching state data cycle.

5. The system of claim 4, wherein the training module is configured to generate the Hidden Markov model by:
    detecting the light signal state in each sampling time point;
    checking if the detected state already exists as a hidden state in the Hidden Markov Model;
    if the corresponding hidden state transition already exists, selecting a hidden state by the destination of the hidden state transition;
    if the hidden state transition is not existing but the received state data can be explained by a particular existing state of the Hidden Markov Model, then selecting the particular existing state;
    if the hidden state transition is not existing and a corresponding hidden state is not in the Hidden Markov Model, creating a new hidden state and selecting the new hidden state;
    updating the before-hidden-state with the latest-hidden-state and the latest-hidden-state with the selected hidden state,
    if no transition exists between the before-hidden-state and the latest-hidden-state, creating a transition between the before-hidden-state and the latest-hidden-state, and
    incrementing a hidden state transition counter between the before-hidden-state and the latest-hidden-state.

6. The system of claim 5, further comprising:
    a probability module configured to determine the probability for a state transition based on an evaluation of all hidden state transition counter values between two subsequent cycle time points in the Hidden Markov Model.

7. The computer system of any of claim 1, wherein the statistical model includes averaged probabilities of one or more signal states for each sampling interval within a switching state data cycle, and wherein the training module is configured to generate the statistical model by:
    recording a statistically relevant sized sample of switching state data cycles;

identifying, for each cycle in the sample of switching state data cycles, a cycle start time; and deriving probabilities for at least one signal state for the sampled switching state data having the same time offsets from the respective cycle start times.

8. A computer-implemented method for providing Signal Phase and Timing (SPaT) messages to a vehicle, wherein the SPaT messages include reliable timing parameters to influence the operation of the vehicle, the method comprising:

receiving switching state data of a traffic light control system on one or more traffic lights via a network communicatively coupled to the traffic light control system, wherein switching state data of a particular traffic light includes signal states comprising at least a pass-state and a stop-state of the particular traffic light at respective sampling time points;

identifying the current signal state of the one or more traffic lights;

deriving, from a statistical model trained on the basis of historic state transitions of the one or more traffic lights, probabilities for future state transitions from the current state into a different state for one or more future prediction intervals, the prediction intervals having the same length as the sampling intervals;

determining a minimum end time as the nearest future prediction interval where the probability of the current state falls below a predefined first threshold value, the minimum end time point being the earliest point in time for a state transition from the current state to the different state;

if the maximum end time point can be identified, determining the maximum end time point as the start of a further nearest prediction interval where the probability of the different state exceeds the predefined second threshold value, the maximum end time point being the latest point in time for a state transition from the current state to the different state, wherein the maximum end time point occurs after the minimum end time point;

composing a SPaT message including the determined minimum end time, and if the maximum end time point is determined, including the determined maximum end time point; and providing the composed SPaT message to the vehicle.

9. The method of claim 8, further comprising:

if the probability of the different state exceeds a predefined second threshold value, determining a maximum end time for a particular state transition from the current state to the different state as the nearest future prediction interval where the probability of the different state exceeds the predefined second threshold value, and estimating a likely time and a corresponding confidence value for the particular state transition, and composing the SPaT message further including the determined maximum end time, the estimated likely time and the corresponding confidence value.

10. The method of claim 8, wherein the statistical model is a Hidden Markov Model representing potential state transitions of the one or more traffic lights with respective probabilities within a switching state data cycle.

11. The method of claim 10, wherein the method further comprises:

detecting the light signal state in each sampling time point;

checking if the detected state already exists as a hidden state in the Hidden Markov Model;

if the corresponding hidden state transition already exists, selecting a hidden state by the destination of the hidden state transition;

if the hidden state transition is not existing but the received state data can be explained by a particular existing hidden state of the Hidden Markov Model, then selecting the particular existing state;

if the hidden state transition is not existing and a corresponding hidden state is not in the Hidden Markov Model, creating a new hidden state and selecting the new hidden state;

updating the before-hidden-state with the latest-hidden-state and the latest-hidden-state with the selected hidden state;

if no transition between before-hidden-state and the latest-hidden-state exist, creating a transition between before-hidden-state and the latest-hidden-state; and incrementing a hidden state transition counter between the before-hidden-state and the latest-hidden-state.

12. The method of claim 11, wherein the probability for a state transition is determined based on an evaluation of all hidden state transition counter values between two subsequent cycle time points of the Hidden Markov Model.

13. The method of claim 8, wherein the statistical model includes averaged probabilities of one or more signal states for each sampling interval within a switching state data cycle.

14. The method of claim 13, further comprising generating the statistical model by:

recording a statistically relevant sized sample of switching state data cycles;

identifying, for each cycle in the sample of switching state data cycles, a cycle start time; and deriving probabilities for at least one signal state for the sampled switching state data having the same time offsets from the respective cycle start times.

15. A non-transitory computer program product that, when loaded into a memory of a computer system for determining state changes of a further system and executed by at least one processor of the computer system, performs the steps:

receiving switching state data of a traffic light control system on one or more traffic lights via a network communicatively coupled to the traffic light control system, wherein switching state data of a particular traffic light includes signal states comprising at least a pass-state and a stop-state of the particular traffic light at respective sampling time points;

identifying the current signal state of the one or more traffic lights;

deriving, from a statistical model trained on the basis of historic state transitions of the one or more traffic lights, probabilities for future state transitions from the current state into a different state for one or more future prediction intervals, the prediction intervals having the same length as the sampling intervals;

determining a minimum end time as the nearest future prediction interval where the probability of the current state falls below a predefined first threshold value, the minimum end time point being the earliest point in time for a state transition from the current state to the different state;

if the maximum end time point can be identified, determining the maximum end time point as the start of a further nearest prediction interval where the probability of the different state exceeds the predefined second threshold value, the maximum end time point being the latest point in time for a state transition from the current state to the different state, wherein the maximum end time point occurs after the minimum end time point;

composing a SPaT message including the determined minimum end time, and if the maximum end time point is determined, including the determined maximum end time point; and providing the composed SPaT message to the vehicle.

16. The computer program product of claim 15, configured to perform the further steps:

if the probability of the different state exceeds a predefined second threshold value, determining a maximum end time for a particular state transition from the current state to the different state as the nearest future prediction interval where the probability of the different state exceeds the predefined second threshold value, and estimating a likely time and a corresponding confidence value for the particular state transition, and composing the SPaT message further including the determined maximum end time, the estimated likely time and the corresponding confidence value.

17. The computer program product of claim 15, wherein the statistical model is a Hidden Markov Model representing potential state transitions of the one or more traffic lights with respective probabilities within a switching state data cycle.

18. The computer program product of claim 17, wherein the method further comprises:

detecting the light signal state in each sampling time point;

checking if the detected state already exists as a hidden state in the Hidden Markov Model;

if the corresponding hidden state transition already exists, selecting a hidden state by the destination of the hidden state transition;

if the hidden state transition is not existing but the received state data can be explained by a particular existing hidden state of the Hidden Markov Model, then selecting the particular existing state;

if the hidden state transition is not existing and a corresponding hidden state is not in the Hidden Markov Model, creating a new hidden state and selecting the new hidden state;

updating the before-hidden-state with the latest-hidden-state and the latest-hidden-state with the selected hidden state;

if no transition between before-hidden-state and the latest-hidden-state exist, creating a transition between before-hidden-state and the latest-hidden-state; and incrementing a hidden state transition counter between the before-hidden-state and the latest-hidden-state.

19. The computer program product of claim 18, wherein the probability for a state transition is determined based on an evaluation of all hidden state transition counter values between two subsequent cycle time points of the Hidden Markov Model.

20. The computer program product of claim 15, wherein the statistical model includes averaged probabilities of one or more signal states for each sampling interval within a switching state data cycle, and the computer program product is further configured to perform generating the statistical model by:

recording a statistically relevant sized sample of switching state data cycles;

identifying, for each cycle in the sample of switching state data cycles, a cycle start time; and deriving probabilities for at least one signal state for the sampled switching state data having the same time offsets from the respective cycle start times.

* * * * *